US011905043B2

(12) United States Patent
Lo et al.

(10) Patent No.: US 11,905,043 B2
(45) Date of Patent: Feb. 20, 2024

(54) METHODS AND SYSTEMS FOR TRAJECTORIES, APPROACHES, FLYBYS, LANDINGS, AND ORBITS IN THREE-OR-MORE BODY SYSTEMS

(71) Applicant: CALIFORNIA INSTITUTE OF TECHNOLOGY, Pasadena, CA (US)

(72) Inventors: Martin W. Lo, Pasadena, CA (US); Brian D. Anderson, Pasadena, CA (US); Ryan Burns, Pasadena, CA (US); Damon Landau, Pasadena, CA (US); Jared T. Blanchard, Stanford, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 365 days.

(21) Appl. No.: 17/506,436

(22) Filed: Oct. 20, 2021

(65) Prior Publication Data
US 2022/0119133 A1   Apr. 21, 2022

Related U.S. Application Data

(60) Provisional application No. 63/230,222, filed on Aug. 6, 2021, provisional application No. 63/142,836, filed
(Continued)

(51) Int. Cl.
*B64G 1/24* (2006.01)
*B64G 1/66* (2006.01)

(52) U.S. Cl.
CPC ........... *B64G 1/242* (2013.01); *B64G 1/2427* (2023.08); *B64G 1/66* (2013.01)

(58) Field of Classification Search
CPC . B64G 1/242; B64G 1/66; B64G 1/24; B64G 1/2427
(Continued)

(56) References Cited

U.S. PATENT DOCUMENTS 5,158,249 A * 10/1992 Uphoff ................... B64G 1/242
                                                            244/158.6
6,078,938 A *  6/2000 Pan ......................... G06F 17/12
                                                            708/502
(Continued)

OTHER PUBLICATIONS

Abarbanel H.D.I. et al., "Local Lyapunov exponents computed from observed data," 1992.
(Continued)

*Primary Examiner* — Andrew Joseph Rudy
(74) *Attorney, Agent, or Firm* — Steinfl + Bruno LLP

(57) ABSTRACT

Systems and methods are described for computing a trajectory of an object in space to a secondary body (M2) in orbit around a primary body to land on, or capture into orbit, or flyby M2 in a Three-Or-More Body Problem. A special plotting of sampled vectors from M2 are integrated backward using a Poincaré Map to form a "Swiss Cheese plot" to find a nominal trajectory. A funnel-like set of trajectories can be constructed along the nominal trajectory for navigation purposes. A global resonant encounter map over a sphere around M2 can be constructed to provide trajectories to, for example, flyby any point near M2, capture into orbit over any point about M2, land on any point on M2. Besides space exploration, there are many applications to the development of Cislunar space commercialization and colonization including asteroid capture and mining.

20 Claims, 27 Drawing Sheets

Related U.S. Application Data on Jan. 28, 2021, provisional application No. 63/094,131, filed on Oct. 20, 2020.

(58) Field of Classification Search
USPC .......................................................... 701/531
See application file for complete search history.

(56) References Cited

U.S. PATENT DOCUMENTS

| | | | | |
|---|---|---|---|---|
| 9,020,357 | B2* | 4/2015 | El Falou | H04B 10/532 |
| | | | | 398/147 |
| 2021/0206517 | A1* | 7/2021 | Kalabic | B64G 1/242 |

OTHER PUBLICATIONS

Anderson B. D. et al., "Dynamics of asteroid 2006 RH120: Temporary capture phase," *AAS/AIAA Spaceflight Mechanics Meeting*, 2019.
Anderson R. L. et al., "Application of Local Lyapunov Exponents to Maneuver Design and Navigation in the Three-Body AAS / AIAA Astrodynamics Specialist Conference," *AAS/AIAA Astrodynamics Specialist Conference*, 8 2003.
Anderson R. L. et al., "Dynamical systems analysis of planetary flybys and approach: Pla-nar Europa Orbiter," Journal of Guidance, Control, and Dynamics, vol. 33, 2010, pp. 1899-1912, 10.2514/1.45060.
Anderson R. L. et al., "Flyby design using heteroclinic and homoclinic connections of unstable resonant orbits," *AAS/AIAA Spaceflight Mechanics Meeting*, vol. 140, 2011.
Barrabés E. et al., "A note on second species solutions generated from p-q resonant orbits," *Celestial Mechanics and Dynamical Astronomy*, vol. 88, No. 3, 2004, pp. 229-244, 10.1023/B:CELE.0000017163.37356.50.
Barrabés E. et al., "Spatial p-q resonant orbits of the RTBP," *Celestial Mechanics and Dynamical Astronomy*, vol. 84, No. 4, 2002, pp. 387-407, 10.1023/A:1021137127909.
Blanchard J. T. et al., "Invariant Funnels for Resonant Landing Orbits," AAS/AIAA *Spaceflight Mechanics Meeting*, 2021.
Blanchard J. T. et al., "Low energy capture into high inclination orbits for ocean worlds missions," *AAS/AIAA Astrodynamics Specialist Conference*, 2020.
Davis D. C. et al., "Trajectory design for Saturnian Ocean Worlds orbiters using multidimensional Pointcare maps," *Acta Astronautica*, vol. 143, No. Mar. 2017, 2018, pp. 16-28, 10.1016/j.actaastro.2017.11.004.
Deserno M, "How to generate equidistributed points on the surface of a sphere," 2004, p. 55128.
Font J. et al., "Consecutive quasi-collisions in the planar circular RTBP," *Nonlinearity*, vol. 15, 1 2002, pp. 115-142, 10.1088/0951-7715/15/1/306.
Henon M., "On the Numerical Computation of Poincaré Maps," *Physica 5D*, 1982, pp. 412-414.
Koon W. S. et al., "Dynamical Systems, the Three-Body Problem and Space Mission Design.", 2006, 10.1142/9789812792617 0222.
Manchester Z. et al., "Robust direct trajectory optimization using approximate invariant funnels," *Autonomous Robots*, vol. 43, 2 2019, pp. 375-387, 10.1007/s10514-018-9779-5.
Parker T.S. et al., "Practical Numerical Algorithms for Chaotic Systems.," *Mathematics of Computation*, vol. 56, 4 2006, p. 377, 10.2307/2008550.
Richardson D. L., "Analytic construction of periodic orbits about the collinear points," *Celestial Mechanics*, vol. 22, No. 3, 1980, pp. 241-253, 10.1007/BF01229511.
S. Wiggins, "Introduction to Applied Nonlinear Dynamical Systems and Chaos." *Springer*, 2 ed., 2003, 10.1007/b97481.
Shao M. Z. et al., "Spherical Sampling by Archimedes' Theorem," *Technical Reports (CIS)*, Univ. of Pennsylvania, No. Jan. 1996, p. 11.
Tobenkin M. M. et al., "Invariant funnels around trajectories using Sum-of-Squares programming," *IFAC Proceedings Volumes (IFAC-PapersOnline)*, vol. 44, 2011, pp. 9218-9223, 10.3182/20110828-6-IT-1002.03098.
V. Szebehely, "Theory of Orbits—The Restricted Three Body Problem," 1967.
Vaquero-Escribano T. M., "Poincare Sections and Resonant Orbits in the Restricted Three-Body Problem." PhD thesis, Purdue University, 2010.
Villac B.F. et al., "Escaping trajectories in the Hill three-body problem and applications," *Journal of Guidance, Control, and Dynamics*, vol. 26, No. 2, 2003, pp. 224-232, 10.2514/2.5062.

\* cited by examiner

METHODS AND SYSTEMS FOR TRAJECTORIES, APPROACHES, FLYBYS, LANDINGS, AND ORBITS IN THREE-OR-MORE BODY SYSTEMS

CROSS-REFERENCE TO RELATED APPLICATIONS

The present application claims priority to U.S. Provisional Patent Application No. 63/094,131 filed on Oct. 20, 2020, U.S. Provisional Patent Application No. 63/142,836 filed on Jan. 28, 2021, and U.S. Provisional Patent Application No. 63/230,222 filed on Aug. 6, 2021, the disclosures of which are incorporated herein by reference in their entirety.

STATEMENT REGARDING FEDERALLY SPONSORED RESEARCH OR DEVELOPMENT

This invention was made with government support under Grant No. 80NMO0018D0004 awarded by NASA (JPL). The government has certain rights in the invention.

BACKGROUND

A typical mode of space travel is to visit a Secondary Body that is orbiting a Primary Body. Examples of the primary and secondary pair are: Sun-Earth, Earth-Moon, Jupiter-Europa, Saturn-Enceladus, Sun-Comet, Sun-Asteroid, Earth-Asteroid Temporarily Captured Around Earth, and so on. The travelling space object can be artificial, like a spacecraft, or natural, like an asteroid or comet.

SUMMARY

Systems and methods are described for three key methods to find special orbits quickly with novel navigation methods to travel around the primary body to capture, flyby, or land on the Secondary Body. The use of new funnel-like structures in the orbit design space shrinks down to the target locations supporting the navigation of such orbits. This makes the orbit more robust to perturbations and errors, making it easier to navigate, thereby substantially reducing the risks involved. NASA's Ocean Worlds Program has targeted the landing on several of the moons of the Outer Planets. There is also growing interest in missions to the Cislunar Space. The Outer Planets (Jupiter, Saturn, Neptune, Uranus) are all mini-solar systems of their own in that they have multiple moons orbiting them like planets around the Sun. The reach these moons, one must design a tour of the moons of the planet, flyby several of the moons using gravity assist to reduce the fuel needed to reach the final target moon. The flybys, capture, and landings all require the use of resonant orbits (explained herein) which is modelled by the Planet-Moon-Spacecraft Circular Restricted Three-Body Problem. But this is also applicable to any three-or-more body systems including those involving small bodies like asteroids, comets, Kuiper Belt objects, etc., throughout the Solar System. While working on some of the mission concepts in the past, it was very difficult to find resonant orbits around the planet to land on location on the moon with high latitudes near the poles. For example, for missions to land on Europa, landings above 60 deg latitude and below −60 deg latitude were very difficult to find.

Similar problems also exist in the Cislunar space between the Earth and its Moon. This is where the greatest potential for applications of the methods and systems of this invention to the development, industrialization, and colonization of the neighborhood around the Earth-Moon space which includes and beyond Cislunar Space, as well as surrounding the entire region all the way around the Earth's orbit. The same methods and systems are also applicable to Near Earth Objects for rendezvous, capture and return of asteroids and comets to Earth for mining, exploration, and other uses. In particular, these methods and systems are critical for the exploration and development of the Earth's Moon. The resonant orbits between the Earth and Moon can be used for the transport of cargo; they can be identified using the Swiss Cheese map and the Global Resonant Encounter Maps; the Invariant Funnels around these resonant orbits can be used for autonomous navigation, simplifying transportation between the Earth and the Moon and captured asteroids in Cislunar space. Besides commercial applications, there are also many applications for defense against rogue asteroids and other hazards. Finally, there are applications to planets and moons throughout the Solar System for explorations and future developments.

The systems and methods described herein utilize new tools: a generalized Poincaré Map called the "Swiss Cheese Plot", an "Invariant Funnel", and a "Resonant Encounter Map" to plot flight paths (low energy trajectories) under CR3BP situations, such as an arrival (landing, or capture into orbit around, of flyby) of a Secondary Body around a Primary Body which may be various combination of Sun-Planet, Planet-Moon, Planet-Asteroid, and other 3-body systems. Additional bodies (4+ body systems) can be dealt with by adding perturbations from additional bodies to the solution from the 3-body method. The following aspects are exemplary and further details are described in the Detailed Description.

In a first aspect of the disclosure, a method is described to provide a nominal trajectory to land an object on a secondary body orbiting a primary body, the method comprising:
selecting a Jacobi constant for a nominal trajectory, the nominal trajectory being a landing trajectory for the object to land on the secondary body at a nominal landing site;
selecting initial conditions comprising a plurality of velocities tangent to the nominal landing site, each of the plurality of velocities having the Jacobi constant;
selecting a surface of section for the primary body;
propagating the initial conditions backwards in time for trajectories to intersect the surface of section;
producing a Poincaré map from the intersections in the surface of section, keeping track of iterations of the trajectories passing through the surface of section;
producing a Swiss Cheese plot of the k-th iterates by producing a Poincaré map of the k-th iterate in at least 2 steps:
  (i) plot all points using Delaunay variables in 2-dimension;
  (ii) plot points from the k-th iterate such that the points using Delaunay variables can be distinguished from the points from the k-th iterate;
using the Swiss Cheese plot of the k-th iterate by locating a plurality of resonant trajectories of the k-th iterate by locating those points of the k-th iterate on the Poincaré map that are close to the center points between vertical holes in the Poincaré map which determine a resonance;
selecting one of the plurality of resonant trajectories as the nominal trajectory.

In a second aspect of the disclosure, a method is described to provide, for an object, a nominal trajectory to fly-by or orbit near a secondary body orbiting a primary body, the method comprising:

selecting a Jacobi constant for a nominal trajectory, the nominal trajectory being a trajectory for the object to fly-by or orbit the secondary body at a nominal target site at a distance R from a center of the secondary body;

selecting initial conditions comprising a plurality of velocities tangent to the nominal target site, each of the plurality of velocities having the Jacobi constant;

selecting a surface of section for the primary body;

propagating the initial conditions backwards in time for trajectories to intersect the surface of section;

producing a Poincaré map from the intersections in the surface of section, keeping track of iterations of the trajectories passing through the surface of section;

producing a Swiss Cheese plot of the k-th iterates by producing a Poincaré map of the k-th iterate in at least 2 steps:
  (i) plot all points using Delaunay variables in 2-dimension;
  (ii) plot points from the k-th iterate such that the points using Delaunay variables can be distinguished from the points from the k-th iterate;

using the Swiss Cheese plot of the k-th iterate by locating a plurality of resonant trajectories of the k-th iterate by locating those points of the k-th iterate on the Poincaré map that are close to the center points between vertical holes in the Poincaré map which determine a resonance;

selecting one of the plurality of resonant trajectories as the nominal trajectory.

DETAILED DESCRIPTION

Figure 1:
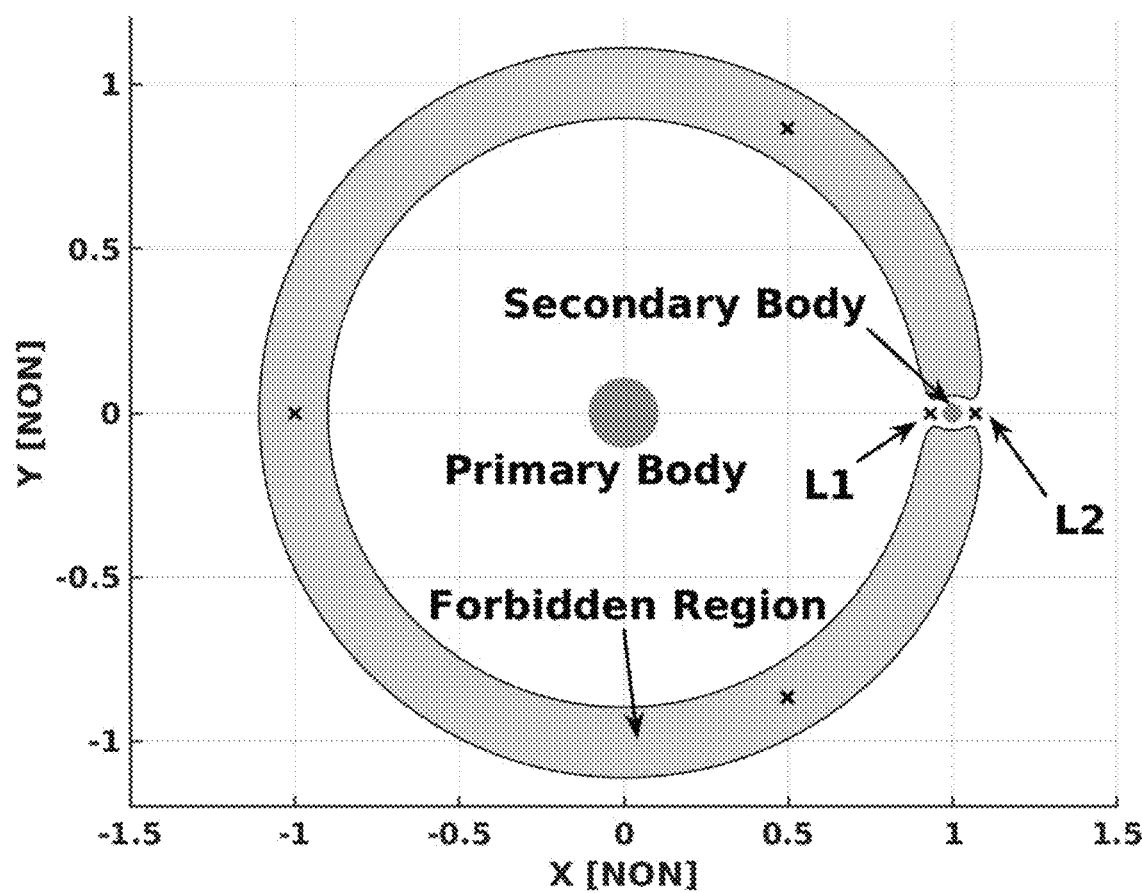
FIG. 1 shows an example of a CR3BP model.

As used herein, a "body" is an object with mass. Typically, herein it would be a planet, moon, other astronomical object, or a spacecraft or other artificial objects.

As used herein, a "spacecraft" is any vehicle or platform, either manned or unmanned, capable of travelling outside Earth's atmosphere. Examples include satellites, probes, landing modules, orbiters, rover spacecraft, penetrator spacecraft, and cargo transport spacecraft, service spacecraft, colonization spacecraft, spacefaring robots.

As used herein, an "orbit" is a trajectory of one body around or partially around another body. Examples include a spacecraft around a primary body, a spacecraft around a secondary body, and a secondary body around a primary body.

A "resonant orbit" is an orbit that has a period approximately commensurate with that of the secondary body, expressed as a ratio between two natural numbers p and q:

$$\frac{p}{q} = \frac{T_2}{T_{SC}} \pm \epsilon \quad (1)$$

where $T_2$ is the period of the secondary body, $T_{SC}$ is the period of the spacecraft, and $\epsilon$ is some tolerance (normally $\epsilon=0.0000000001$). For example if p:q=5:6 then the spacecraft completes 5 orbits about the primary in about the same time that the secondary completes 6 orbits. An exterior resonant orbit has p<q, while an interior resonant orbit has p>q.

A "periodic resonant orbit" is an orbit that returns to the same initial state after some time (the Poincaré section of a periodic orbit is a finite number of points). There are both stable and unstable periodic orbits.

A "pseudo-resonant orbit" is an orbit which shadows a periodic resonant orbit. Examples are the trajectories on the invariant manifolds of the periodic resonant orbits. A manifold is a high dimensional surface. Invariant manifolds are a tubular structure formed form trajectories that either approach a periodic orbit or depart a periodic orbit. This is a special feature of the Three-Body Problem which does not exist in the Two-Body Problem. Most orbits in this work are pseudo-resonant orbits. With perturbations and navigation errors and using the real ephemeris of the Solar System, there are no "true resonant orbits" to speak of. As time progresses, these orbits may evolve to different values of p and q through heteroclinic connections, especially if they make a close flyby of the secondary body.

An "SOI-resonant orbit" is a pseudo-resonant orbit that returns to the sphere of influence (SOI) of the secondary body retaining the p:q resonance condition. Flybys and landing orbits are included in this group. Most flyby orbits transition from one resonance to another while in the SOI.

A "flyby trajectory" is a trajectory that enters and exits the SOI without intersecting the surface of the secondary body.

A "landing trajectory" is a trajectory that intersects with the surface of the secondary body as it travels. Pseudo-resonant orbits can be landing trajectories given their use in connecting flybys of other small bodies to a landing site.

A "nominal trajectory" is a trajectory of interest for a particular design problem, e.g. this can be a landing orbit or a flyby orbit. The nominal trajectory is used for computing an invariant funnel or resonant encounter map. The nominal trajectory as a function of time is denoted by x(t). Typically, the landing condition is chosen to be at the periapsis of the orbit. The time at landing or periapsis is t=0, so the state at landing or periapsis is $$x(0) = x_0 = \begin{bmatrix} r_0 \\ v_0 \end{bmatrix}.$$

As used herein, a "resonant ring" is a region, normally an annulus or ring, on the resonant encounter map where all initial conditions share the same resonance.

In embodiments described herein, the Circular Restricted Three-Body Problem (CR3BP) dynamic model is used. Standard barycentric normalized coordinates can be used. The mass parameter ρ is defined as $$\mu = \frac{m_2}{m_1 + m_2} \quad (2)$$

where $m_1$ is the mass of the primary body and $m_2$ is the mass of the secondary body, where $m_1$ is greater than (or equal to) $m_2$. This gives a range of p in the range of 0 to 0.5. Some example approximate values are µ(Jupiter/Europa) $=2.5280176826\times10^{-5}$ and µ(Earth/Moon)$=1.2150577033\times 10^{-2}$.

For the purposes of this method, the primary and secondary bodies are defined to be in circular orbits about their barycenter with a period normalized to $2\pi$. The distance between them is normalized to 1. The CR3BP can be plotted in the rotating frame, meaning the primary and secondary bodies are fixed on the x-axis at $x_1=-\mu$ and $x_2=1-\mu$ respectively.

FIG. 1 illustrates this model with the barycenter at the origin. [NON] refers to non-dimensional units. The primary and secondary bodies lie on the x-axis at $-\mu$ and $1-\mu$ respectively. The equilibrium points (Lagrange points) are marked by black x's, with L1 and L2 lying immediately to the left and right of the smaller body. The grey region is the forbidden region, bounded by the zero-velocity curve. The shape of the forbidden region depends on the Jacobi constant, C. Setting µ=0.001 and C=3.035 produces this plot where the L2 gateway is clearly visible.

The six-dimensional state x of the third body (such as the spacecraft) is composed of the position r and velocity v, where:

$$r = [x\ y\ z]^\top \quad (3)$$

$$v = [\dot{x}\ \dot{y}\ \dot{z}]^\top \quad (4)$$

$$x = \begin{bmatrix} r \\ v \end{bmatrix} \quad (5)$$

Since the mass of the third body, the spacecraft, is negligible compared to that of the primary and secondary, it is considered to have no gravitational effect on either of the large bodies, hence the restricted three-body problem. The equations of motion for a particle in the CR3BP rotating frame are $$\ddot{x} = -\left((1-\mu)\frac{x+\mu}{\|r_1\|^3} + \mu\frac{x-1+\mu}{\|r_2\|^3}\right) + x + 2\dot{y} \quad (6)$$

$$\ddot{y} = -\left((1-\mu)\frac{y}{\|r_1\|^3} + \mu\frac{y}{\|r_2\|^3}\right) + y + 2\dot{x} \quad (7)$$

$$\ddot{z} = -\left((1-\mu)\frac{z}{\|r_1\|^3} + \mu\frac{z}{\|r_2\|^3}\right) \quad (8)$$

$$r_1 = [(x+\mu), y, z]^\top \quad (9)$$

$$r_1 = [(x+\mu), y, z]^\top \quad (10)$$

The augmented potential is $$U(r) = \frac{(x^2+y^2)}{2} + \frac{(1-\mu)}{\|r_1\|} + \frac{\mu}{\|r_2\|} \quad (11)$$

and the Jacobi constant is $$C(r,v) = 2U(r) - v^T v \quad (12)$$

The forbidden region is defined for a given Jacobi constant C as the area bounded by the zero-velocity surface $v_0=\{r\in \mathbb{R}^3 | 2U(r)=C\}$. There are five equilibrium points in the CR3BP, L1-L5, known as libration points or Lagrange points. The Jacobi constant of a libration point is computed with v=0 (e.g., $C_{L2}=C(r_{L2}; 0)$). As the Jacobi constant decreases below $C_{L2}$, the forbidden region shrinks and splits apart, first at L1, then at L2, as shown in FIG. 1. This effectively creates a gateway for spacecraft to approach the secondary body from the exterior or interior regions.

Figure 2:
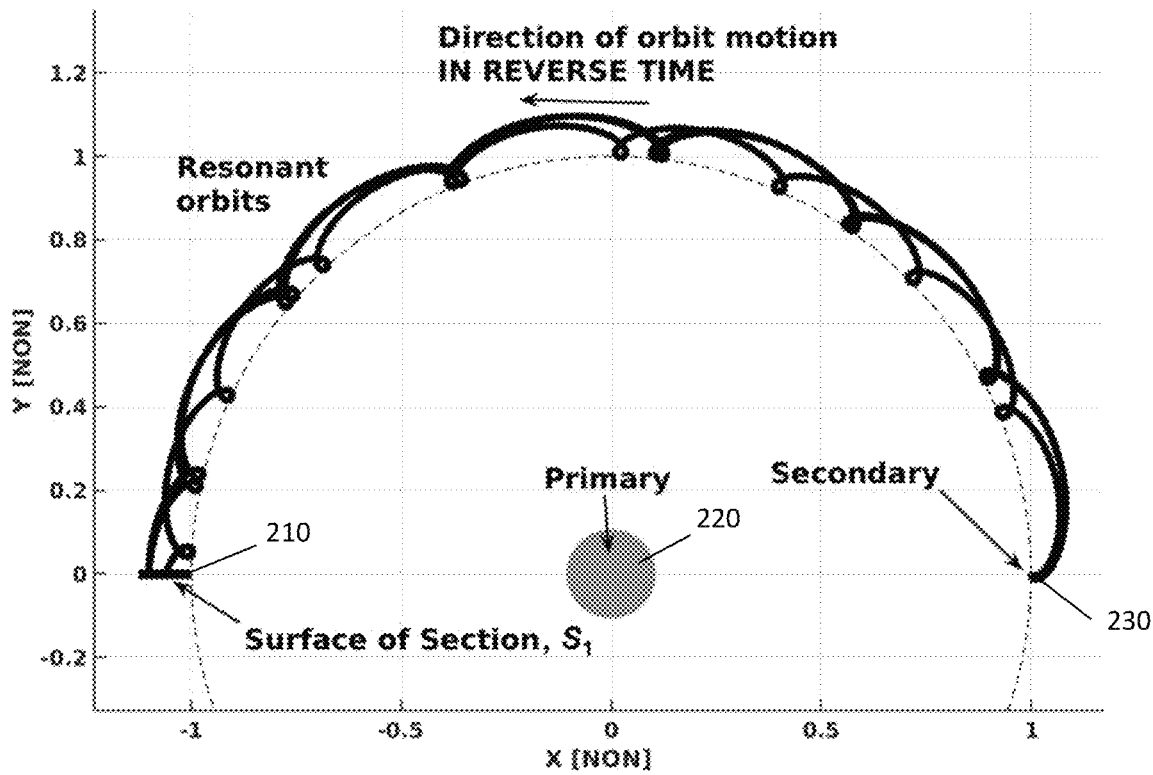
FIG. 2 shows an example of a surface of section in a 3-body problem.
Figure 39:
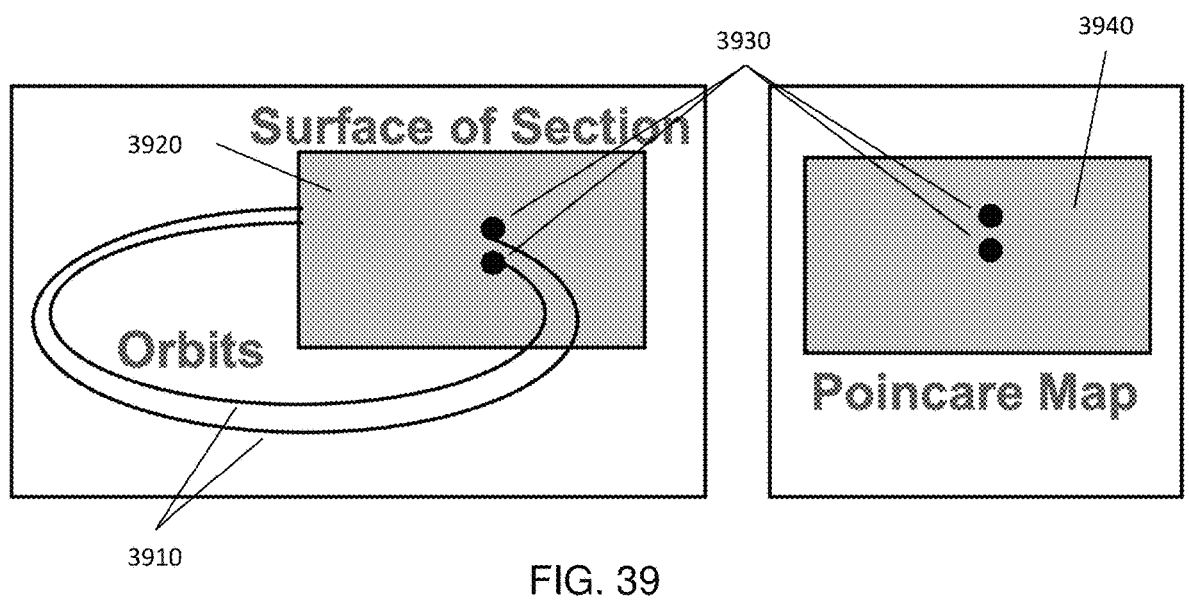
FIG. 39 shows an example of how the points passing through the surface of section become the Poincaré map.

To reduce the dimensions of the system (for easier analysis), a Poincaré map can be utilized. When many orbits are present, it can be like spaghetti, very difficult to visualize. Poincaré thought of placing a plane cutting across the orbits and study the resulting discrete plot of points which is much easier to analyze. FIG. 39 illustrates the idea, with orbit trajectories (3910) being back integrated to a surface of section (3920) provide points (3930) that form the Poincaré map (3940). The plane is called a "surface of section" and it can be replaced by a surface when it is convenient. More generally, a Poincaré map is a discrete map between two surfaces of section in some high dimensional system. The spatial CR3BP has a 6-dimensional phase space with a 5-dimensional energy surface. The standard Poincaré map reduces the dimensions of this system by 1, hence, it is 4-dimensional. FIG. 2 shows an example of a generalized Poincaré map on which the concept of the Swiss Cheese plot is based. One of the novelties of the Swiss Cheese plot is the reduction in dimension of the standard Poincaré map from 4 dimensions to our 2-dimensional Swiss Cheese plot. The two dimensional "surface of section" $S_1$ (210) is a half-plane associated with the primary body (220), the surface of section defined by $$S_1=\{(x,y,z)|y=0, x<0\} \quad (13)$$

with a second surface of section, $S_2$, being, for landing solutions, the surface of the secondary body (230) (e.g., moon) defined by $$S_2=\{(x,y,z)|(x-1+\mu)^2+y^2+z^2=R_2^2\} \quad (14)$$

where $R_2$ is the radius of the secondary body. In the case where the destination is an orbit around the secondary body or a flyby trajectory around the secondary body, $R_2$ can be the distance from the center of mass of the secondary body to the planned orbit/flyby nearest approach.

In embodiments of the invention, the system and method includes forming a Swiss Cheese plot.

A Swiss Cheese plot starts with a 2D Poincaré section taken at $S_1$ with Delaunay variables L and $\bar{g}$ as axes. The plot is used to identify a nominal trajectory to a desired landing site or periapsis location. It can also be used to identify periodic resonant orbits. The 2D map is achieved by using a 2D surface of velocity directions centered at the landing site as the starting conditions for the surface of section. One of the key novelties here is the calculation of the 2D Poincaré section to form the Swiss Cheese plot in the 6D phase space. Whereas the typical Poincaré section in the 6D phase space has to be 4-dimensional, which is extremely difficult to work with due to its high dimension.

Figure 3:
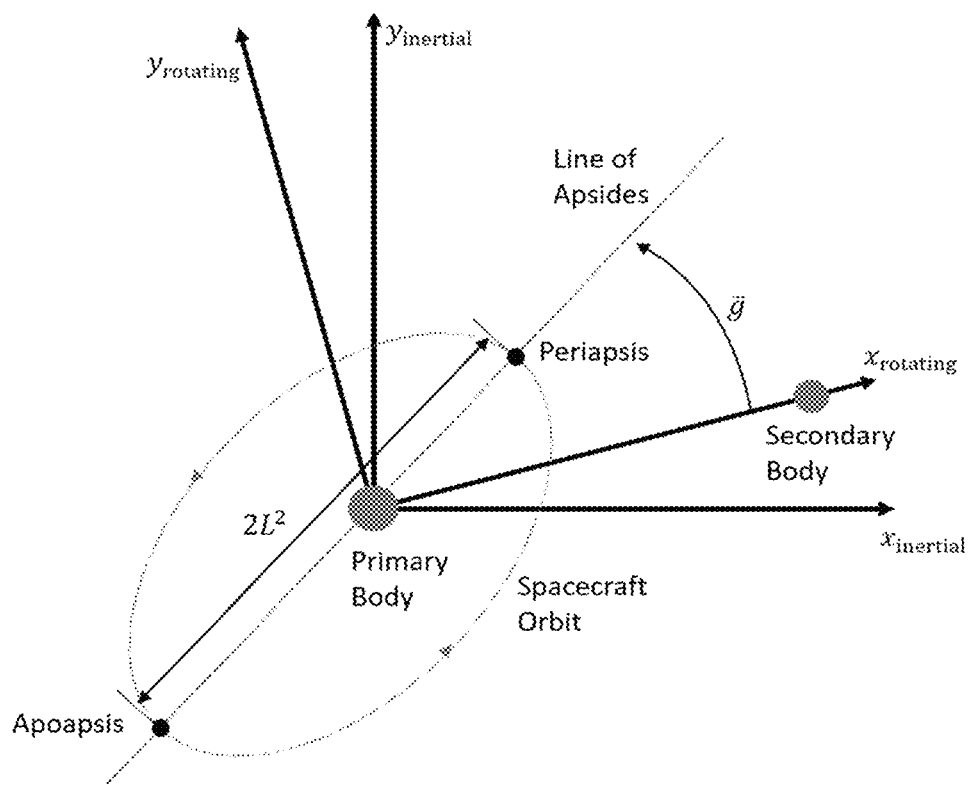
FIG. 3 shows an illustration of the Delaunay Variables.

In order to form the Swiss Cheese plot, the values of the Delaunay variables L and $\bar{g}$ need to be determined for each event state. These can be calculated, for example, as shown below and are represented graphically in FIG. 3. Delaunay variables are an alternate system of orbital elements used to fully describe a state.

$$r = \sqrt{x^2 + y^2} \quad (15)$$

$$\theta = \tan^{-1}\left(\frac{y}{x}\right) \quad (16)$$

$$\dot{r} = \dot{x}\left(\frac{x}{r}\right) + \dot{y}\left(\frac{y}{r}\right) \quad (17)$$

$$\dot{\theta} = -\dot{x}\left(\frac{y}{r^2}\right) + \dot{y}\left(\frac{x}{r^2}\right) \quad (18)$$

$$G = r^2(1+\dot{\theta}) \quad (19)$$

$$L = \left(-\left(\frac{G^2}{r^2}\right) + \left(\frac{2}{r}\right) - \dot{r}^2\right)^{-1/2} \quad (20)$$

$$\bar{g} = \theta - \cos^{-1}\left(\frac{\frac{G^2}{r}-1}{e}\right) \quad (21)$$

Note that in the normalized CR3BP, $L=\sqrt{a}$ and $\bar{g}=\omega-t$.

In embodiments of the system and method, forming a Swiss Cheese plot includes selecting initial conditions. A Swiss Cheese plot is formed by plotting back-integrated trajectories intersecting the surface of section against a plot of a standard Poincaré map formed from the Delaunay variables.

Define a set of initial conditions at the point of interest to find an orbit that reaches a given point on or near the secondary body. These 6-dimensional initial conditions share the same position and Jacobi constant. A landing site or periapsis location, $r_0$, and a Jacobi constant, $C_0$ are selected. The Jacobi constant must be less than that of the L2 libration point, $C_{L2}$, to allow for both interior and exterior resonant orbits to appear. If the Jacobi constant is greater than $C_{L2}$, then the L2 gateway is closed. With $r_0$, and $C_0$ chosen, $v_0$ is constrained to have magnitude:

$$\|v_0\| = \sqrt{x_0^2 + y_0^2 + \frac{2(1-\mu)}{\|r_1\|} + \frac{2\mu}{\|r_2\|} - C_0} \quad (22)$$

Therefore, there are two remaining degrees of freedom to define the velocity direction.

Figure 37:
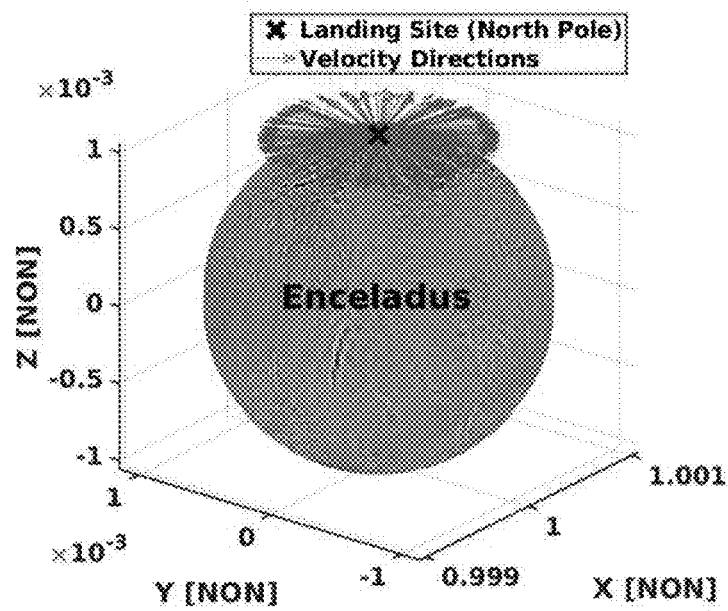
FIG. 37 shows an example of sampling unit vectors for all azimuth angles but constrained in elevation.
Figure 38:
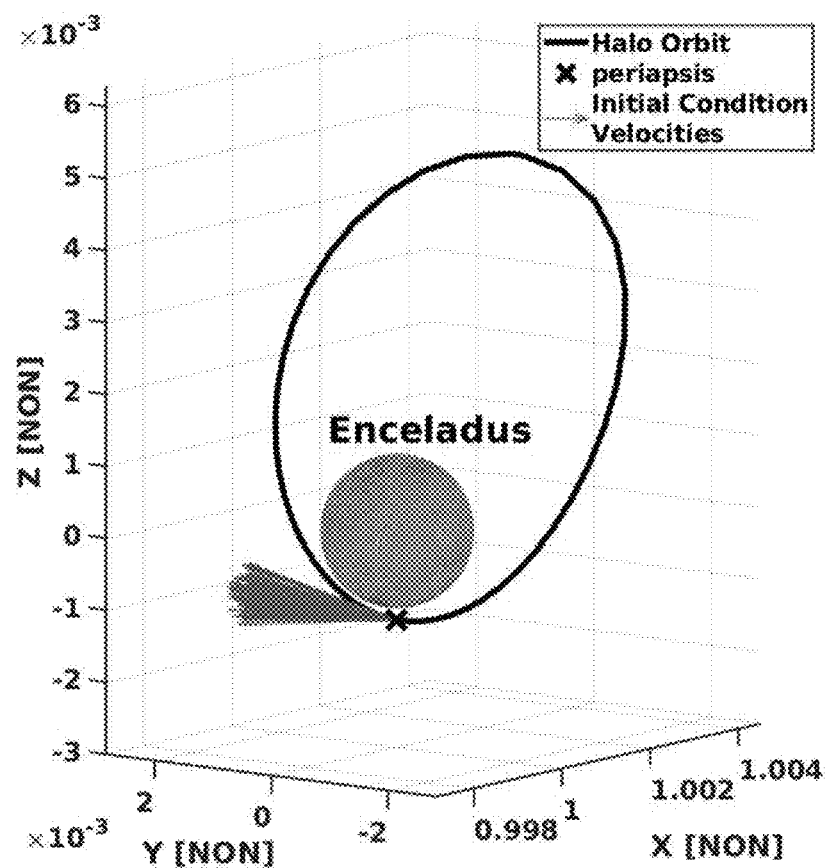
FIG. 38 shows an example of sampling unit vectors constrained within a cone.

Sample $N_v$ unit vectors originating at the location $r_0$ with different directions in those two degrees of freedom. The sampling is done with different methods depending on if this is targeting a landing location or a periapsis. For example, when targeting a landing location, constrain the flight path angle, $\phi$, to be within some limits (e.g., between 0 to 5 degrees) and sample directions using Archimedes' theorem. If targeting a periapsis, constrain the velocity direction to a disc perpendicular to $r_2$ and sample uniformly along the circumference. FIG. 37 shows an example of sampling unit vectors for all azimuth angles but constrained in elevation to $-5°$ to $0°$. FIG. 38 shows an example of sampling unit vectors to be within a cone with an opening angle $\alpha=5°$.

Figure 10:
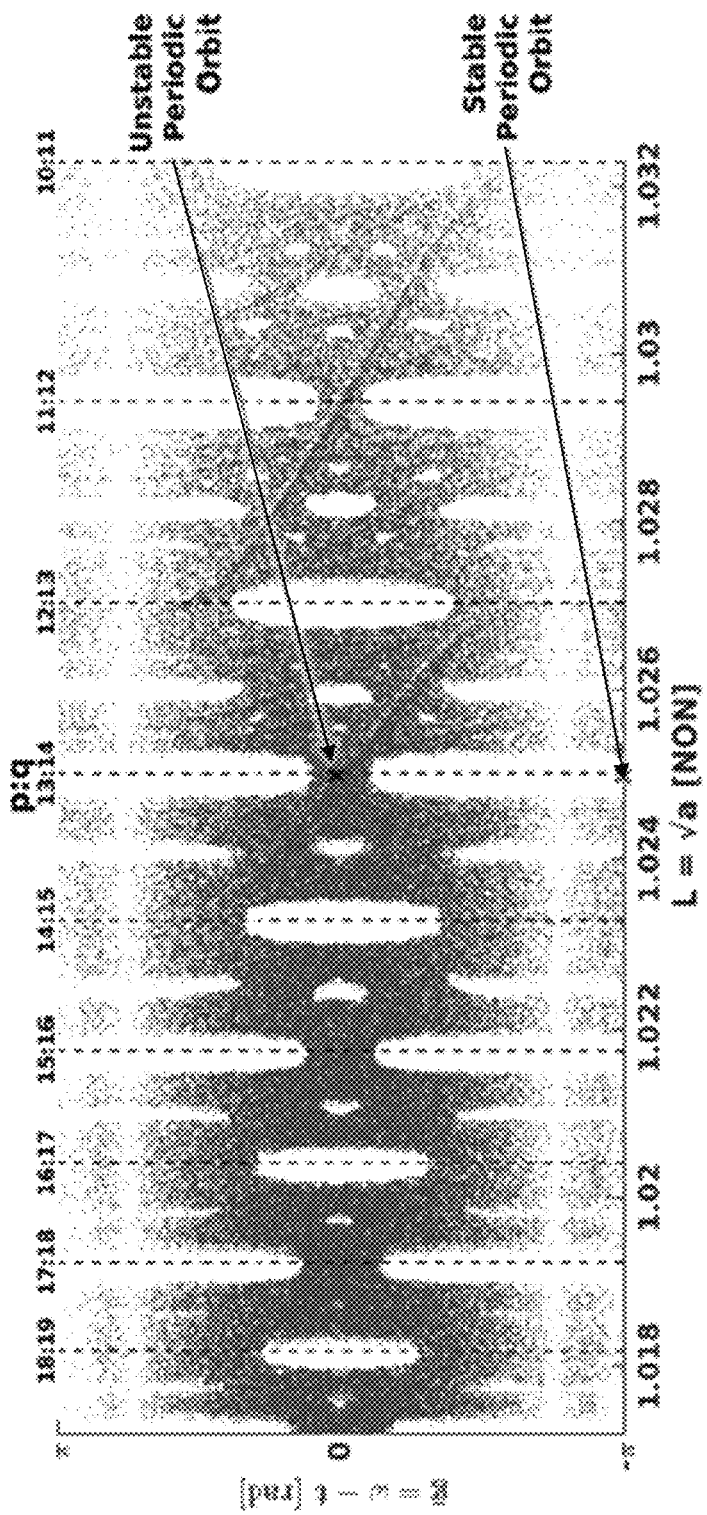
FIG. 10 shows an example Swiss Cheese plot.

FIG. 10 shows an example Swiss Cheese plot. Every point corresponds to an impact trajectory that lands on the surface of the secondary body at the south pole with flight path angle $\phi<5$ degrees and passes through the surface of section. The gaps correspond to stable quasi-periodic resonant orbits surrounding the stable periodic orbit at the center. The p:q resonances at the top correspond to the L variable indicated by the vertical dashed lines. Stable orbits are usually avoided, as they make changing trajectory more difficult.

Figure 11:
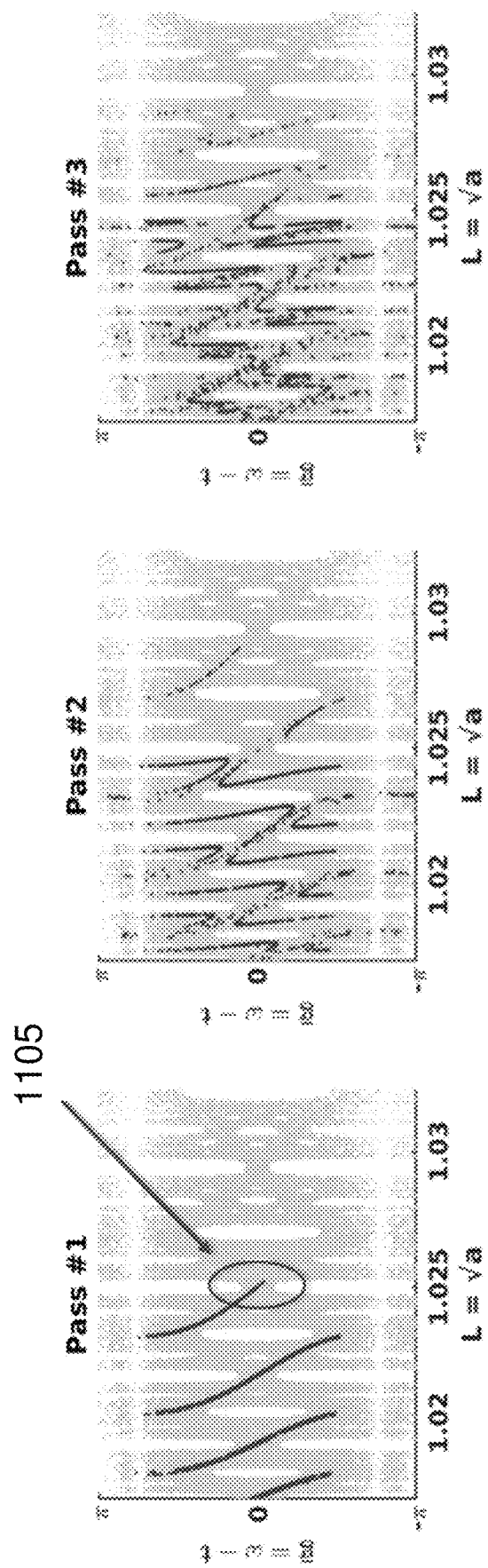
FIG. 11 shows states on the Swiss Cheese plot of FIG. 10 for different number of passes.

The initial conditions are integrated backwards in time and the state at each pass (a number (e.g., "k") of iterations of intersections with the surface of section) is recorded to build the plot. The k-th iterate is plotted such that it can be distinguished from the standard plot (the plot points from the Delaunay variables). For example, this can be done graphically by plotting the k-th iterations in one color or tone and the Delaunay variable derived points in another color or tone (e.g., black points against grey points). A change of coordinates can be used to find exact events (see e.g., Henon [13]). Programs on parallel computers and GPUs can be used to speed up the integration, allowing for tens of thousands of trajectories to be integrated in parallel. As trajectories pass through 51 for the first time, smooth curves are shown. With each subsequent pass, the plot looks more chaotic. See e.g., FIG. 11.

The events can be converted to the Delaunay variables L and $\bar{g}$. Planar Delaunay variables can be calculated in a rotating frame [7]. As stated above, L=$\sqrt{a}$, and since a is a function of period T, each L will correspond to a specific resonance value as shown below:

$$\frac{p}{q} = L^{-3} \quad (23)$$

Note that the unstable pseudo-resonant orbits where p is odd are at apoapsis in the Poincaré section, while those where p is even are at periapsis. This alternating effect can be seen in the gaps in the map, which alternate being centered around $\bar{g}$=0 and $\bar{g}$=π radians. The gaps correspond to stable quasi-periodic orbits with the stable periodic orbits at the center of the gap. The unstable periodic orbit for each resonance is located exactly π radians above.

From the Swiss Cheese plot, a nominal trajectory can be selected from a pseudo-resonant orbit of a desired resonance. In some embodiments, this is picked from a point that came during a first pass in the Swiss Cheese plot. The case for landing on the North Pole of Enceldus is used here as an example on how to use the Swiss Cheese Plot to find a nominal trajectory, in this case, a resonant trajectory landing at the North Pole. FIG. 37 illustrates how the initial conditions are determined. In this example the landing position is the North Pole, P, of Enceladus. Select a Jacobi constant, C, for this case. Then select n velocities V1, V2, . . . Vn tangent to P uniformly distributed in all directions. These states (P, V1), (P, V2) . . . (P, Vn) all have the same Jacobi constant C. Integrate these initial states backwards until they intersect the surface of section to form the black dots on the Poincaré Map of FIG. 11. The plot for Pass #1 shows a circle (1105) around the line of black dots where the 13:14 resonance can be determined. This is because the background of grey dots are the Poincaré Map of the resonances. Each resonant orbit is indicated by the vertical line of holes. The desired unstable resonant orbit is located exactly in the middle between the vertical holes. The circle in plot Pass #1 captures the location of the 13:14 resonance. Although this example describes this method for landing on the North Pole of Enceladus, this method is equally applicable for any point on the surface of Enceladus. It is also applicable for any point on the surface of a sphere centered at Enceladus. The case for the sphere is for the design of a close flyby of Enceladus where capture into orbit around Enceladus is also possible.

Figure 5:
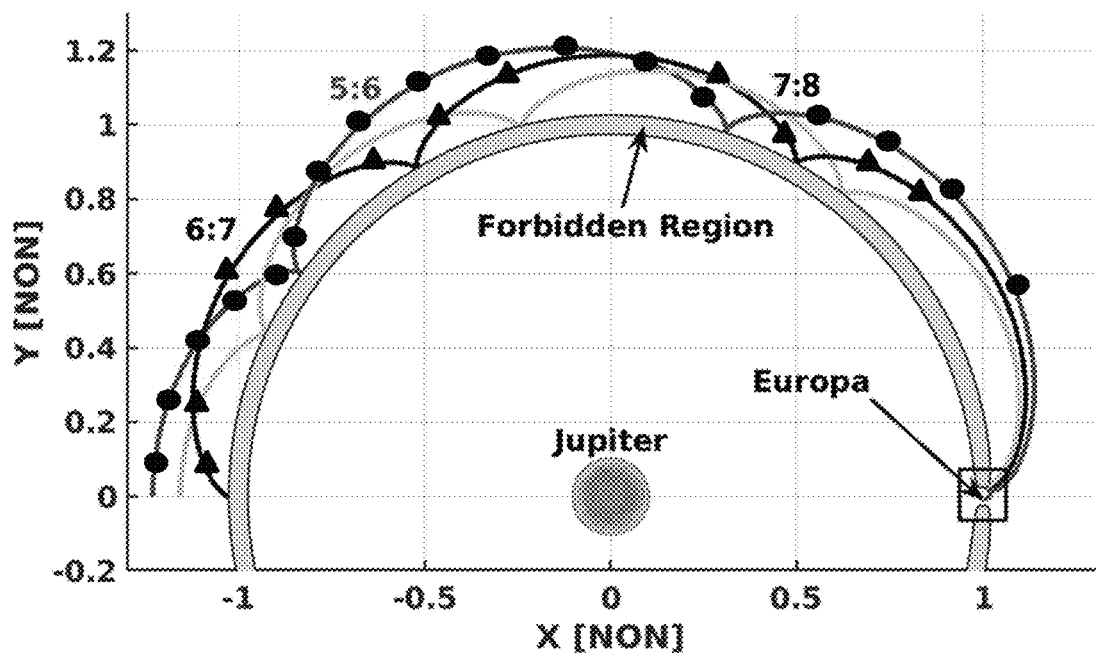
FIG. 5 shows example landing trajectories of different resonances back-propagated (integrated back) to a surface of section.
Figure 6:
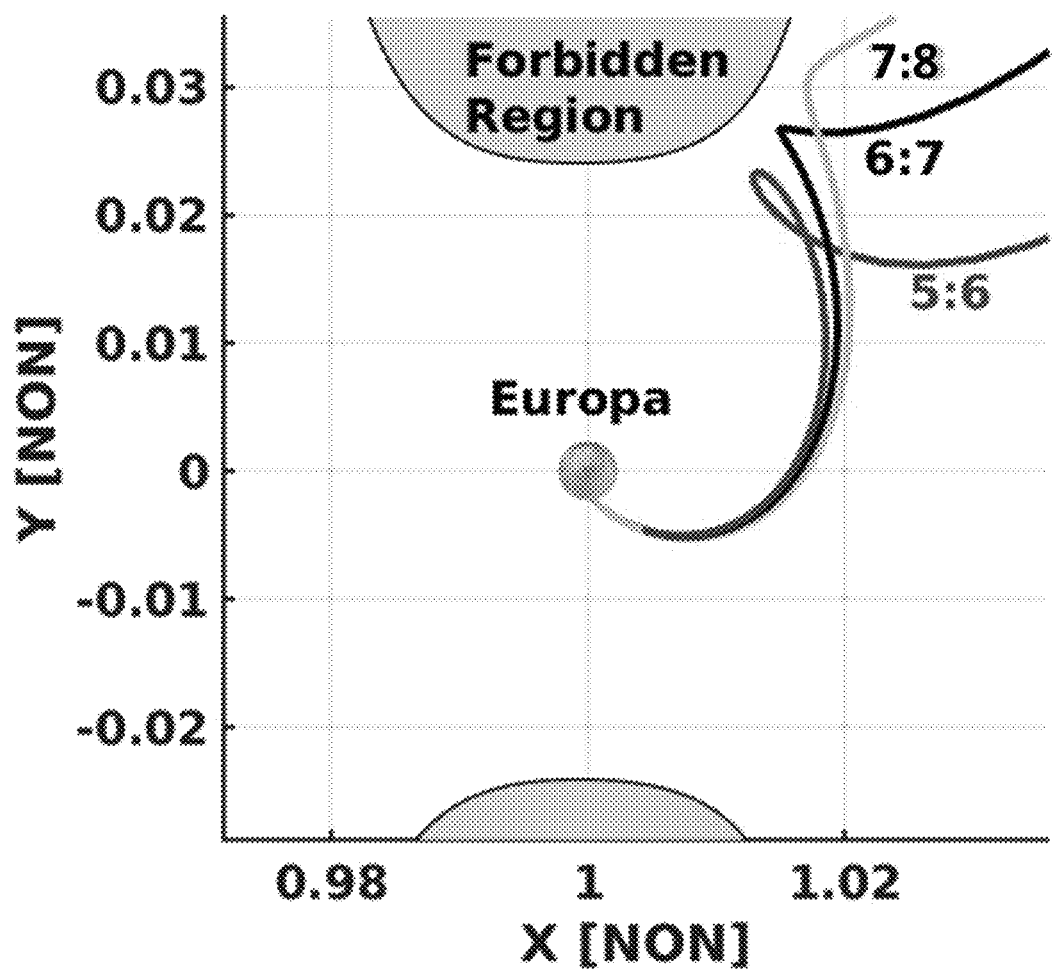
FIG. 6 shows a close-up of the trajectories near the secondary body.

FIG. 5 shows examples of nominal landing trajectories back-propagated to $S_1$. The orbits are classified p:q (e.g. 6:7) by their period with respect to the primary body. FIG. 6 shows a close-up of the secondary body (here, Europa) with the trajectories converging on the landing site.

In embodiments of the system and method, an invariant funnel is created based on the nominal trajectory.

An invariant funnel is a set of trajectories that converge to a nominal trajectory as t increases. In some embodiments, all trajectories of the funnel share the same Jacobi constant and have parallel velocities at the landing site or periapsis.

Beginning with a nominal pseudo-resonant trajectory (flyby or landing), perhaps found using the Swiss Cheese plot as shown above, the Jacobi constant $C_0$ is determined from a state along the trajectory. The landing/periapsis state ($r_0$, $v_0$) can be used to avoid numerical errors.

Figure 12:
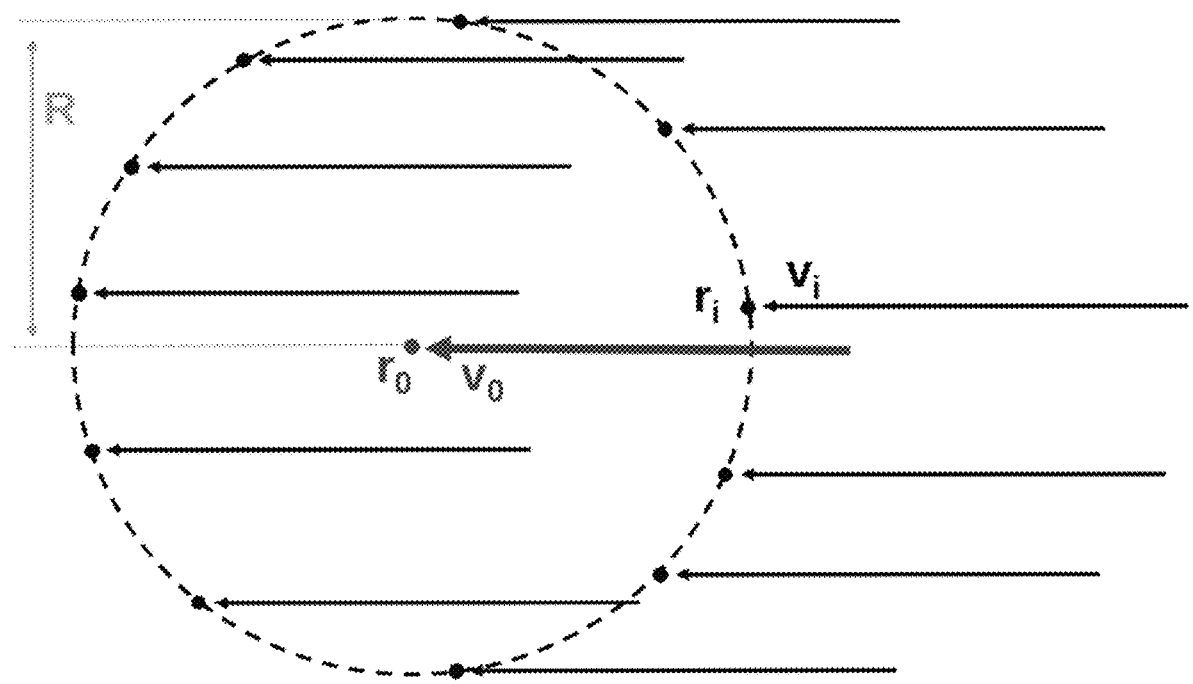
FIG. 12 shows an example of a set of initial conditions centered around a location (e.g., landing spot).

A set of $N_r$ positions are sampled in a ring of radius R around the periapsis/landing site. The sampled points can be within the ring (circle) or just at the periphery. The area can be a circle, but other shapes (e.g., ellipse, square, etc.) can also be used. See e.g., FIG. 12. To each of these position vectors assign a velocity vector parallel to the original velocity vector. Constrain the magnitude of each velocity vector so that each state has the same Jacobi constant (see eq. 22).

Figure 13:
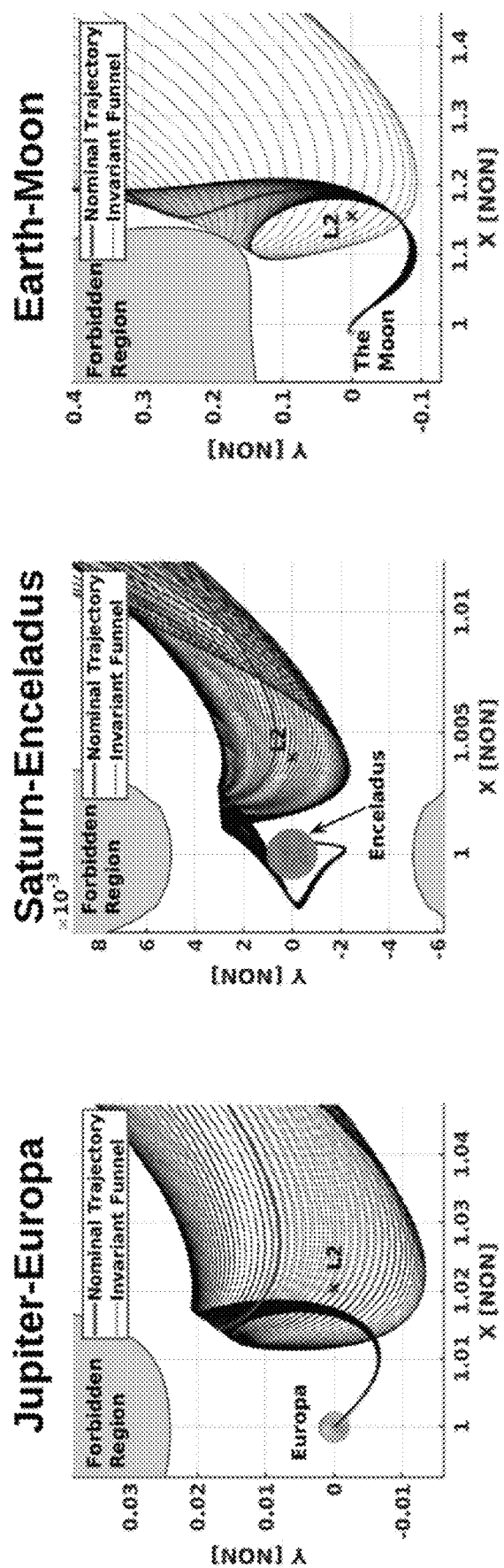
FIG. 13 shows three examples of invariant funnels.

As long as R is small enough, the initial conditions will trace out an invariant funnel about the original trajectory when integrated backward. The funneling effect is particularly strong near L1 and L2. Any initial condition inside the ring will stay within the funnel, unless R is too large. Then the funnel will diverge into chaos, with some trajectories exiting through the L1 gateway and others through L2. The radius where this begins to happen is $R_{max}$ which must be determined numerically. Examples of invariant funnels for various systems are shown in FIG. 13.

In embodiments of the system and method, a resonant encounter map is created based on the nominal trajectory.

Figure 7:
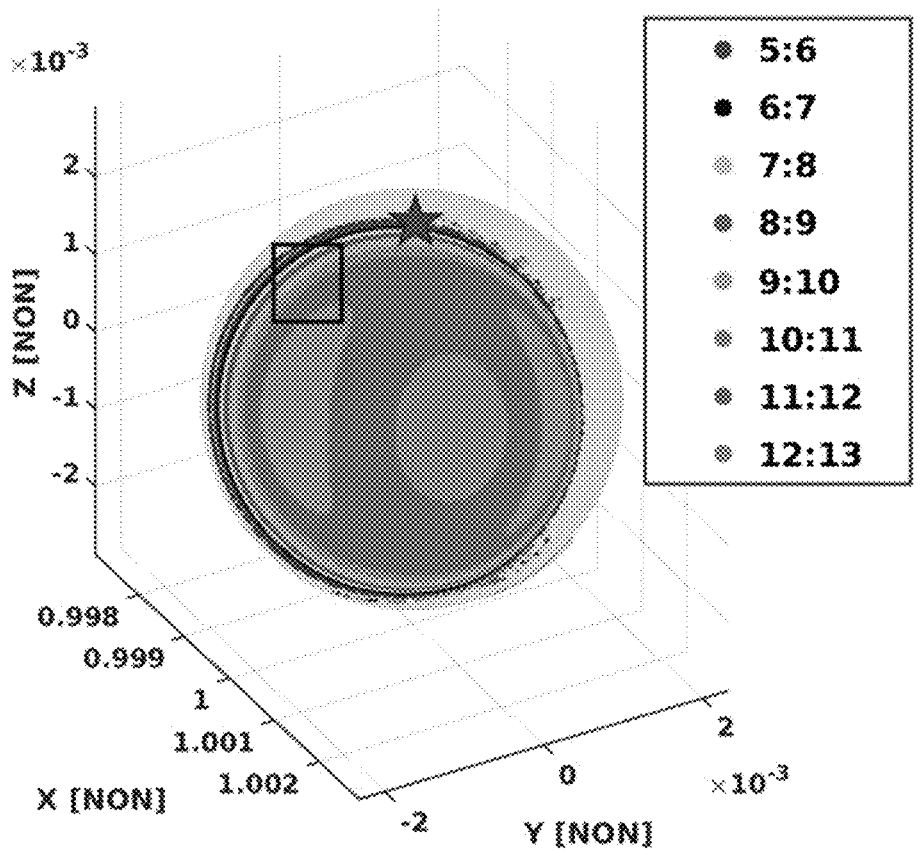
FIG. 7 shows an example resonant encounter map.
Figure 8:
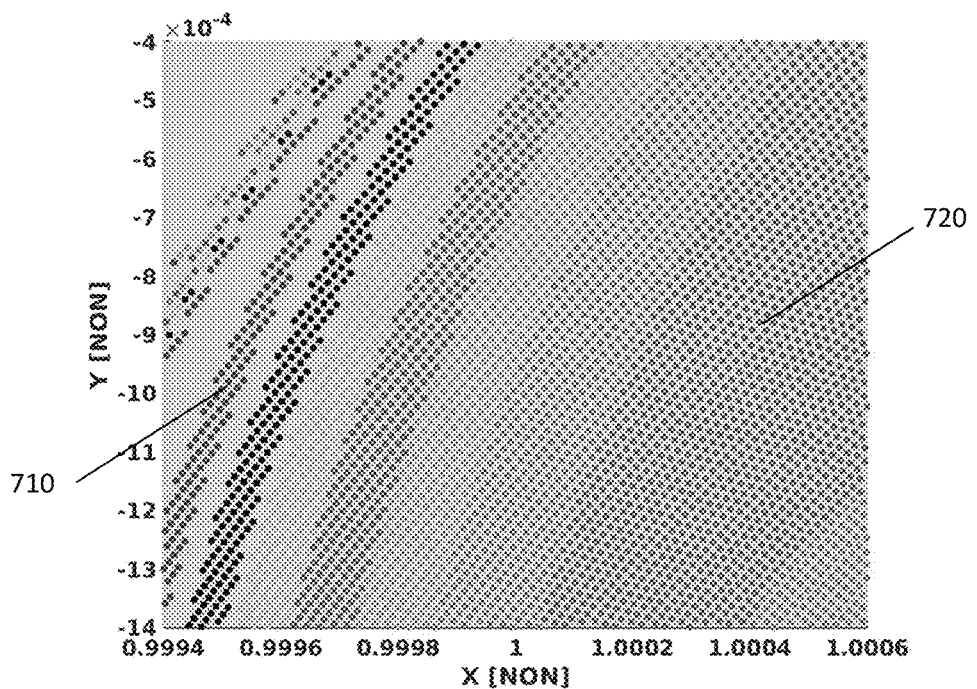
FIG. 8 shows a blow-up of a section (black rectangle) of FIG. 7.

A resonant encounter map is a mapping on the entire surface of the secondary body that shows all of the possible resonances of landing trajectories. The landing states all share the same Jacobi constant and velocity direction as some nominal trajectory. The landing trajectories are not necessarily SOI-resonant. An example resonant encounter map is shown in FIGS. 7 and 8 (FIG. 8 showing a blow-up of a portion of FIG. 7).

A "resonant ring" is a region, normally an annulus or ring, on the resonant encounter map where all initial conditions share the same resonance. For example, FIG. 8 shows a thin region of 5:6 pseudo-resonant orbits (710). The 11:12 region (720) near the center can also be called a resonant ring even though it is topologically not an annulus.

Figure 14:
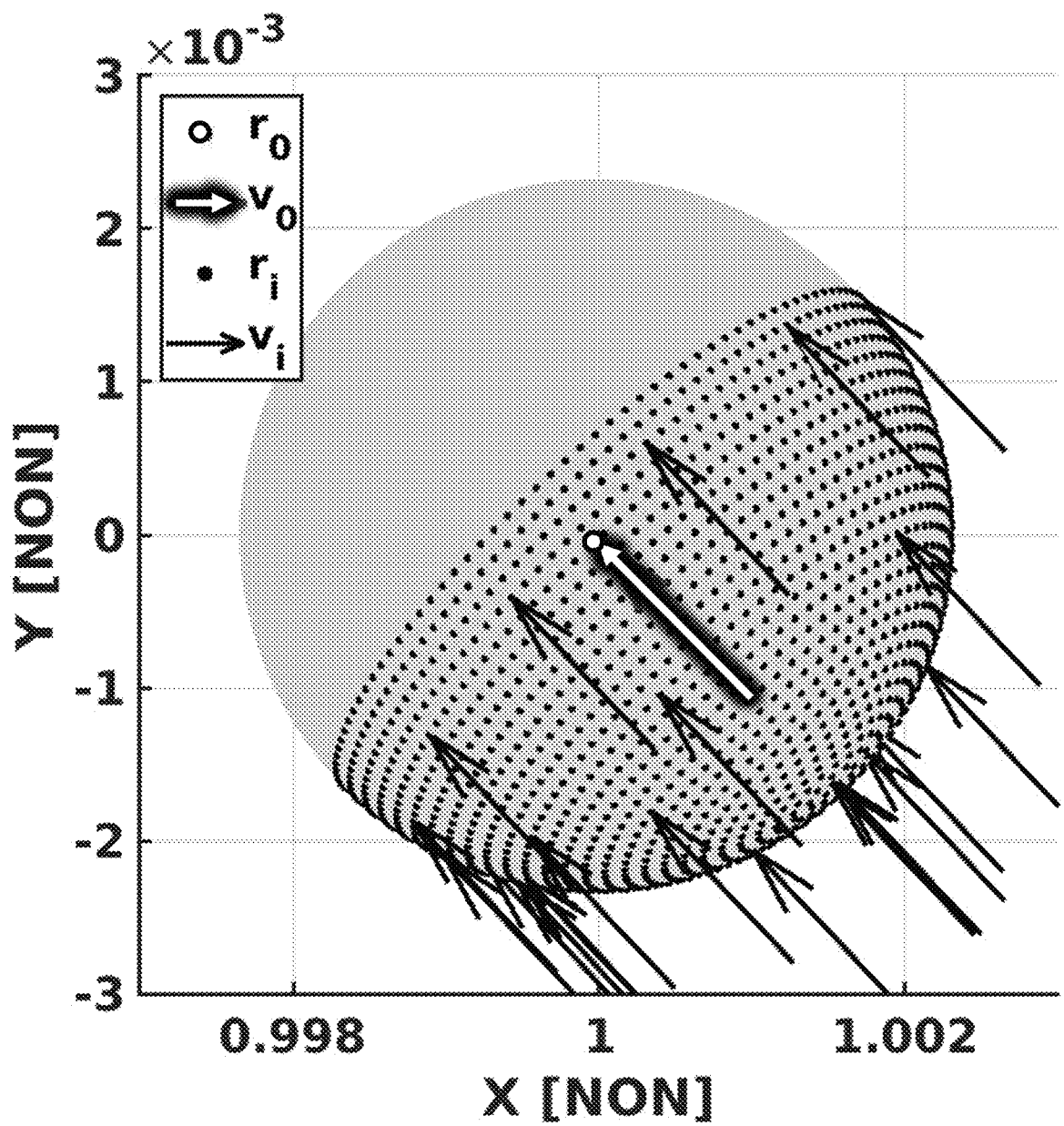
FIG. 14 shows an example of the initial conditions for a resonant encounter map.

Similar to the invariant funnel, begin with a nominal landing trajectory with landing state ($r_0$, $v_0$) and corresponding Jacobi constant $C_0$. Then generate a set of position vectors n for i=1 N covering the entire surface of the sphere. FIG. 14 shows an example of initial conditions for a resonant encounter map, with $r_0$ being the nominal trajectory and n being the sampled position vector locations. Deserno's method [14] can be used to distribute the points nearly uniformly across the sphere. Other methods, such as the Archimedes method, can also be used—some producing a random distribution of points across the sphere. The goal is to use some method to produce a nearly uniform distribution of points on the sphere to discretize the sphere for numerical calculations. Next, assign a velocity to each point with the same direction as $v_0$, but scaled as to give each state the same Jacobi constant (eq. 22). Almost half of the initial conditions are infeasible as their velocity points out of the surface of the secondary. Prune these by asserting that $(r_i-r_2)^T v_i<0$. As N goes to infinity, the initial conditions for the resonant encounter map can be written in set notation as $$X=\{(r_i,v_i)\in \mathbb{R}^3\times \mathbb{R}^3 | \|r_i-r_2\|=R_2, v_i\times v_0=0, (r_i-r_2)^T v_i<0,$$
$$C_i(r_i,v_i)=C_0\} \quad (24)$$

Figure 15:
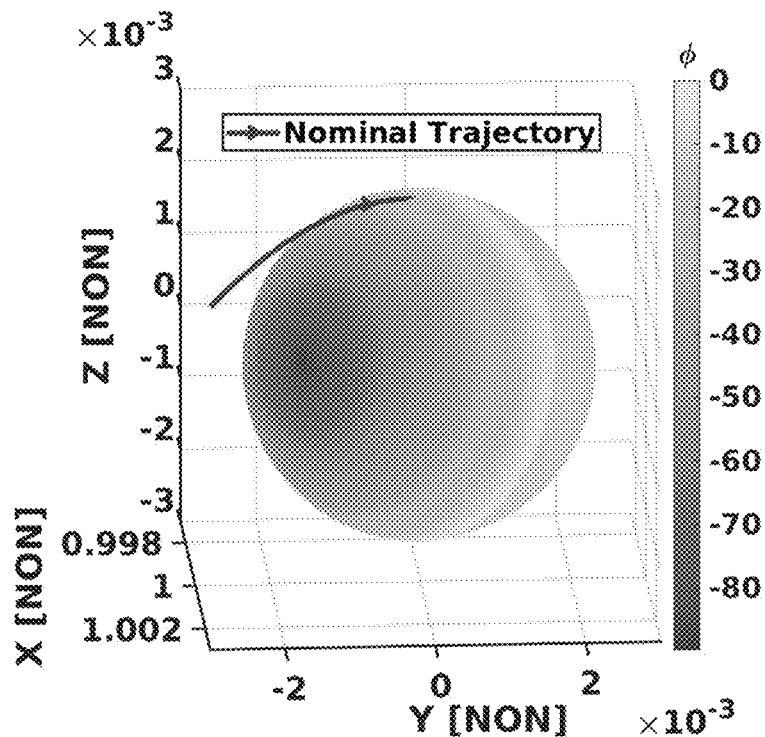
FIG. 15 shows an example of a hemisphere of initial conditions shaded based on the flight path angle, t.
Figure 16:
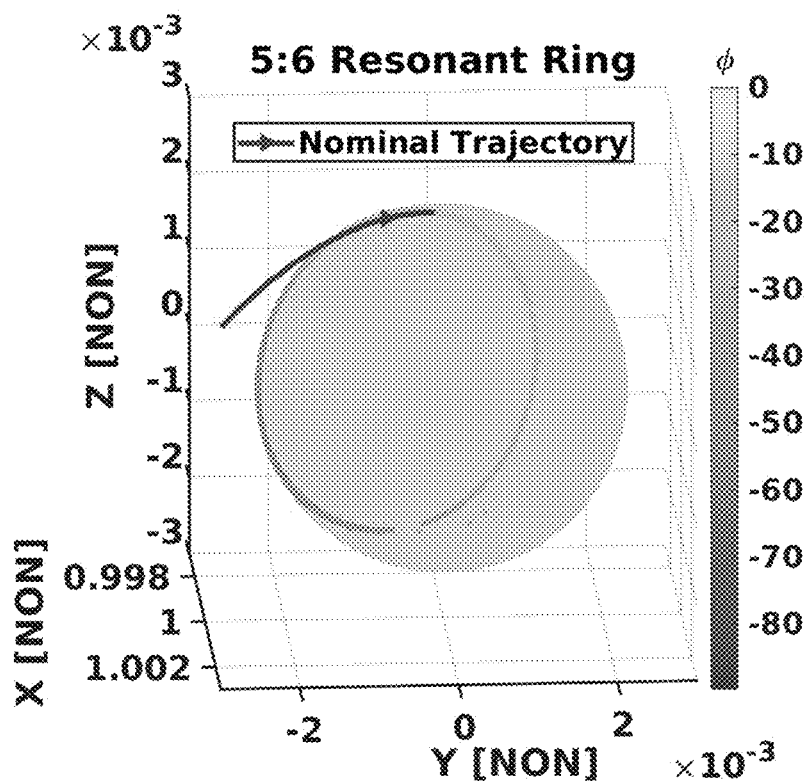
FIG. 16 shows a 5:6 resonant ring based on the initial conditions of FIG. 15.

The flight path angle, $\phi$, for the initial conditions varies widely even across a single resonant ring (see e.g., FIGS. 15 and 16). In this example shown in FIG. 16, the nominal trajectory is 5:6 resonant and has a shallow flight path angle $\phi_0 \approx -10°$. The entire 5:6 resonant ring varies by almost 35° across the ring.

Just as with the invariant funnel, integrate each of these initial conditions backward in time (t<0) until they reach S1 (the XZ plane). At that point, compute the Delaunay variable L (see eq. 20) and the approximate resonance p:q (see eq. 25).

$$\frac{p}{q} = L^{-3} + \epsilon \quad (25)$$

FIG. 15 shows an example hemisphere of initial conditions on the surface of a secondary body shaded according to flight path angle. Since all initial velocities are parallel, the flight path angle varies from 0° to −90° across the hemisphere. FIG. 16 shows that, for FIG. 15, the 5:6 resonant ring does not have a uniform flight path angle, rather it varies from −10° to −44°.

Figure 17:
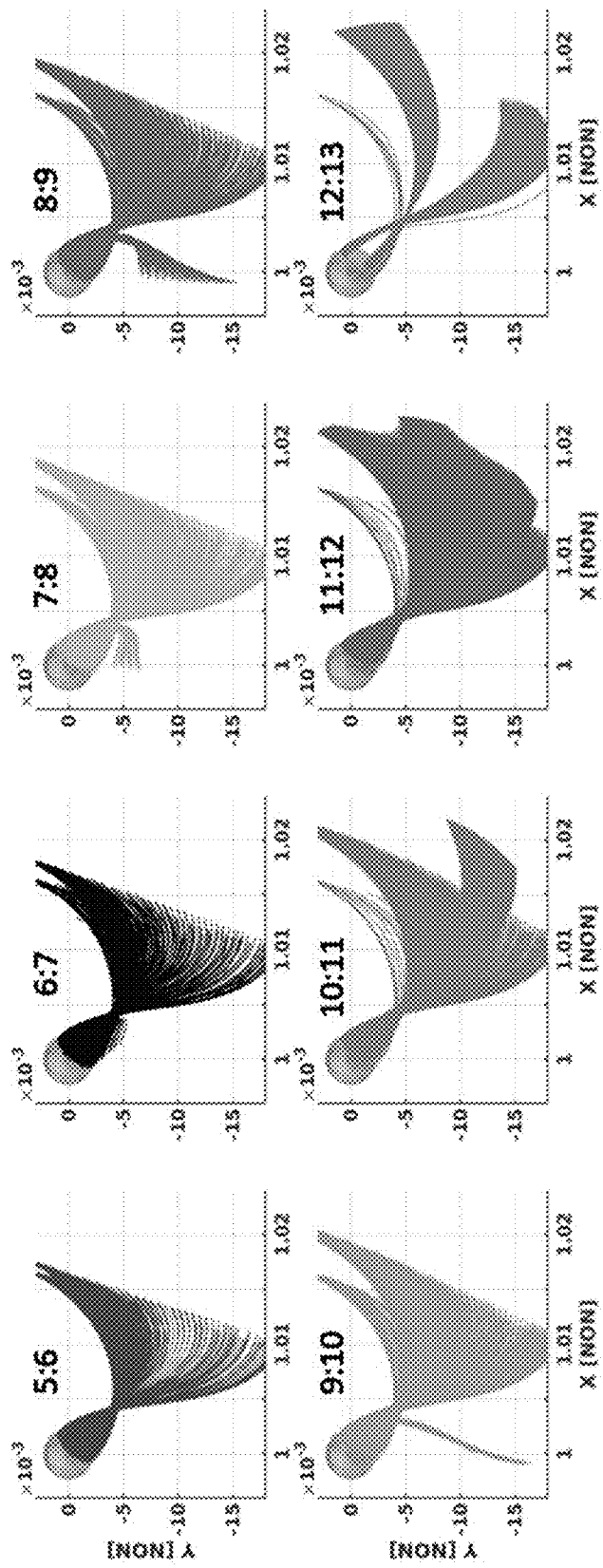
FIG. 17 shows examples of integrating each resonant ring backwards in time.

FIG. 17 shows examples of these backward integrated trajectories near the secondary body, grouped by resonance. Each shade corresponds to a different resonant ring.

Figure 18:
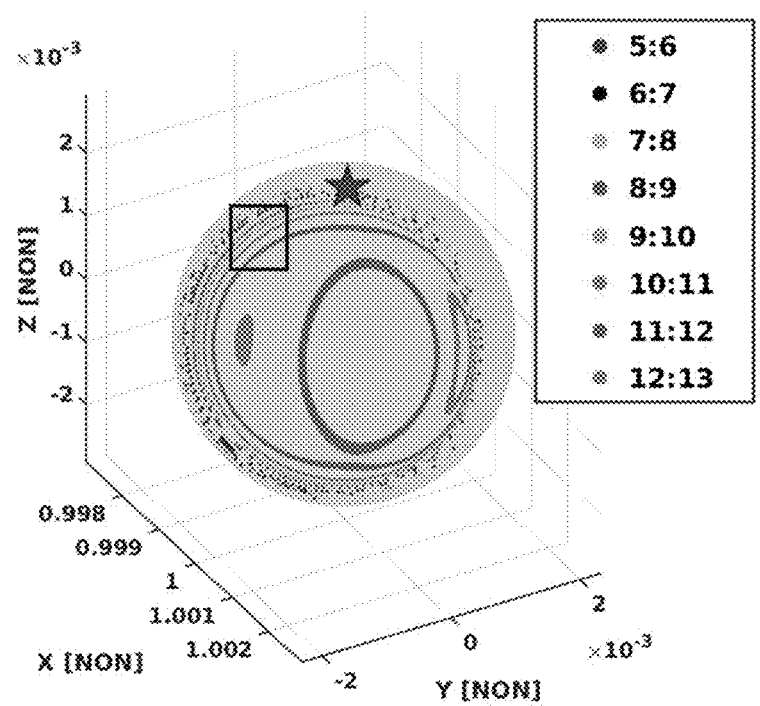
FIG. 18 shows the same resonant encounter map as shown in FIG. 7 but generated with $\varepsilon$=5e-4 and $C_0$=3:0020. The star shows the nominal landing site.
Figure 19:
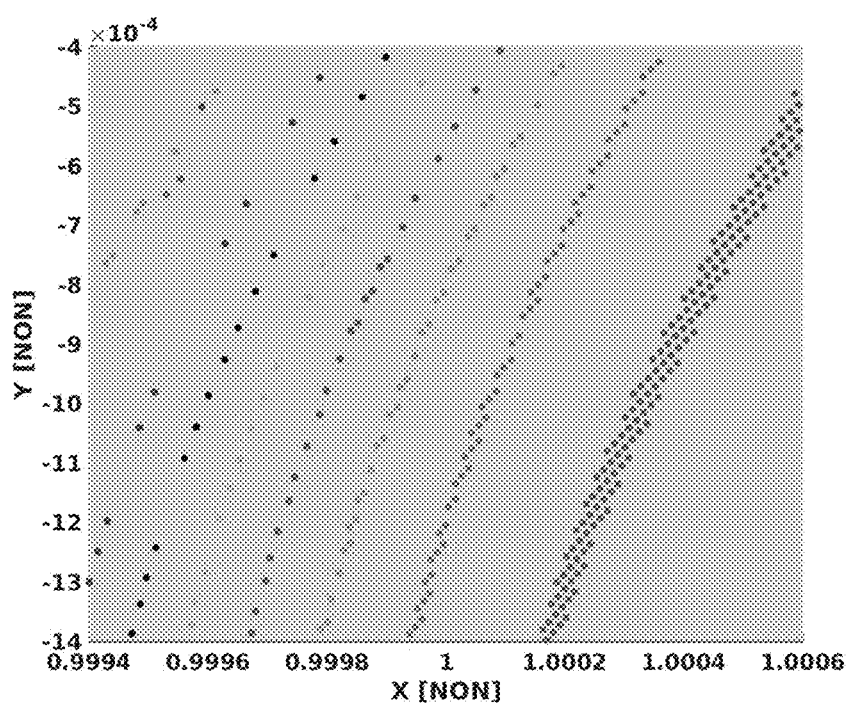
FIG. 19 shows a blow-up of a section (black rectangle) of FIG. 18.

Plot the initial conditions on the surface of the sphere, differentiating them by resonance (e.g., color coding). Decreasing c from 0.01, a thinning of the ringed regions corresponding to each resonance is observed, as shown in FIGS. 18 and 19 (FIG. 19 being a blow-up of a portion of FIG. 18).

Figure 20:
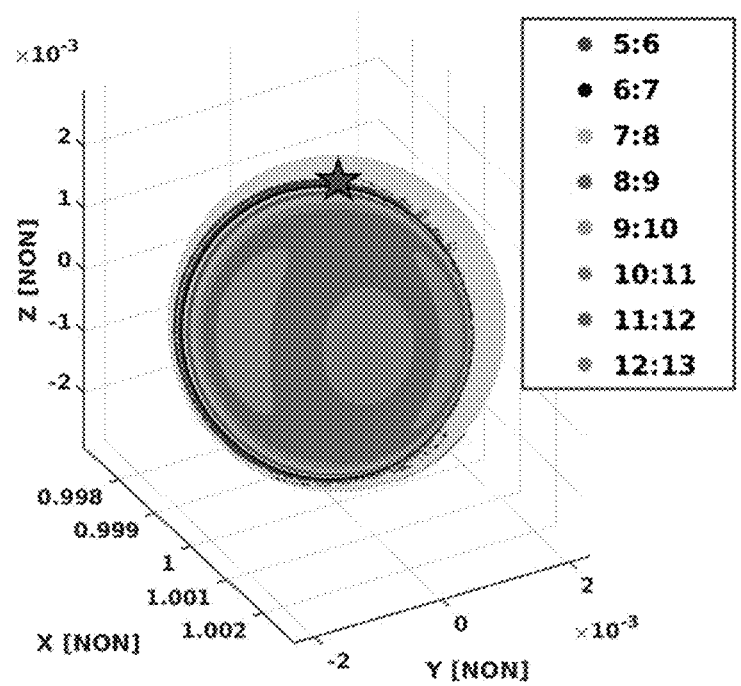
FIG. 20 shows an example 5:6 resonant map
Figure 21:
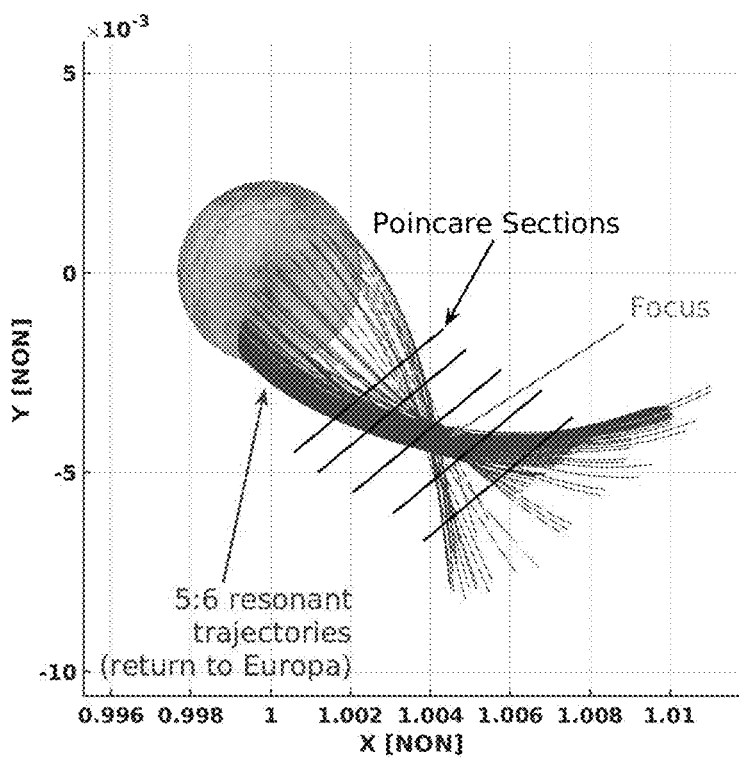
FIG. 21 shows a resonant ring of FIG. 20 integrated backward through the focus.

Every resonant ring passes through a region of convergence, or "focus", close to the secondary body as it is integrated backward. See e.g., FIGS. 17 and 21 (FIG. 21 being the 5:6 trajectories of FIG. 20).

Figure 9:
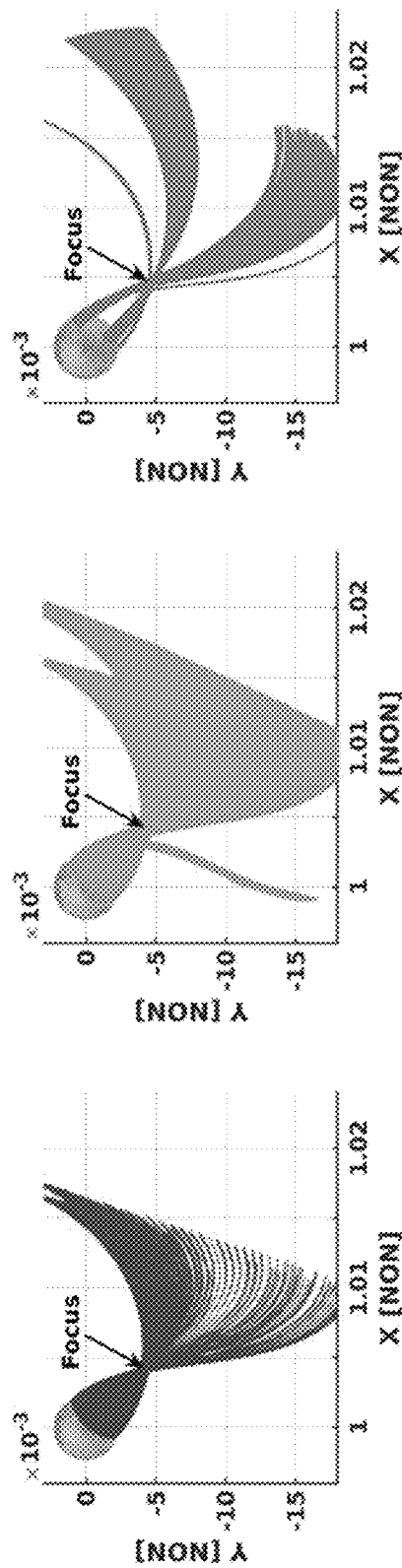
FIG. 9 shows three example backward integrations of different resonances.

As used herein, a "focus" is a region of convergence that appears when integrating a resonant ring backward. FIG. 9 shows examples of foci for resonant rings integrated backward: 5:6 (left), 9:10 (center), and 12:13 (right).

Figure 22:
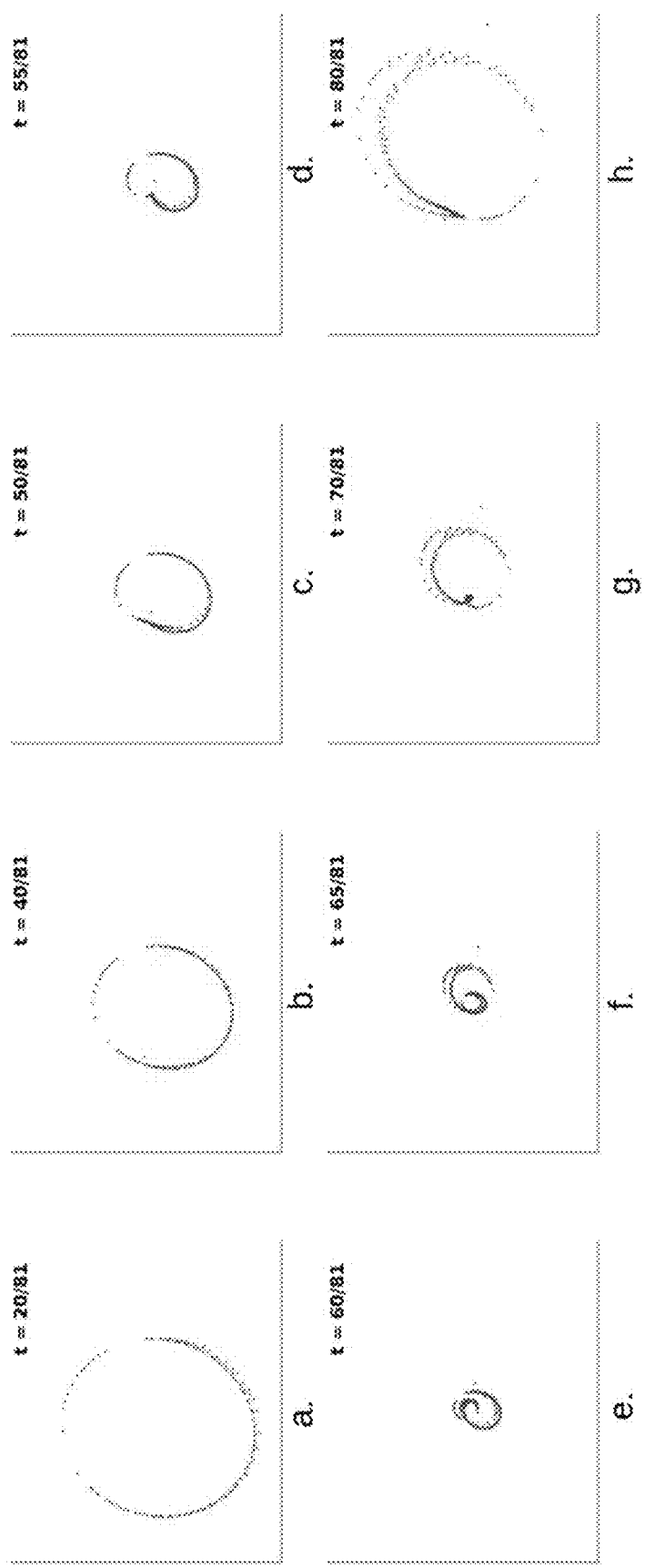
FIG. 22 shows an example of the evolution of the 5:6 resonant encounter map as it is integrated backward through the focus.

Taking Poincaré sections along the trajectories, one can visualize how the topology of the resonant ring changes. FIG. 22 shows an example of a set of Poincaré sections for a 5:6 resonant ring. As the trajectories pass through the focus, they pass through each other in configuration space, effectively turning the ring inside out.

Figure 23:
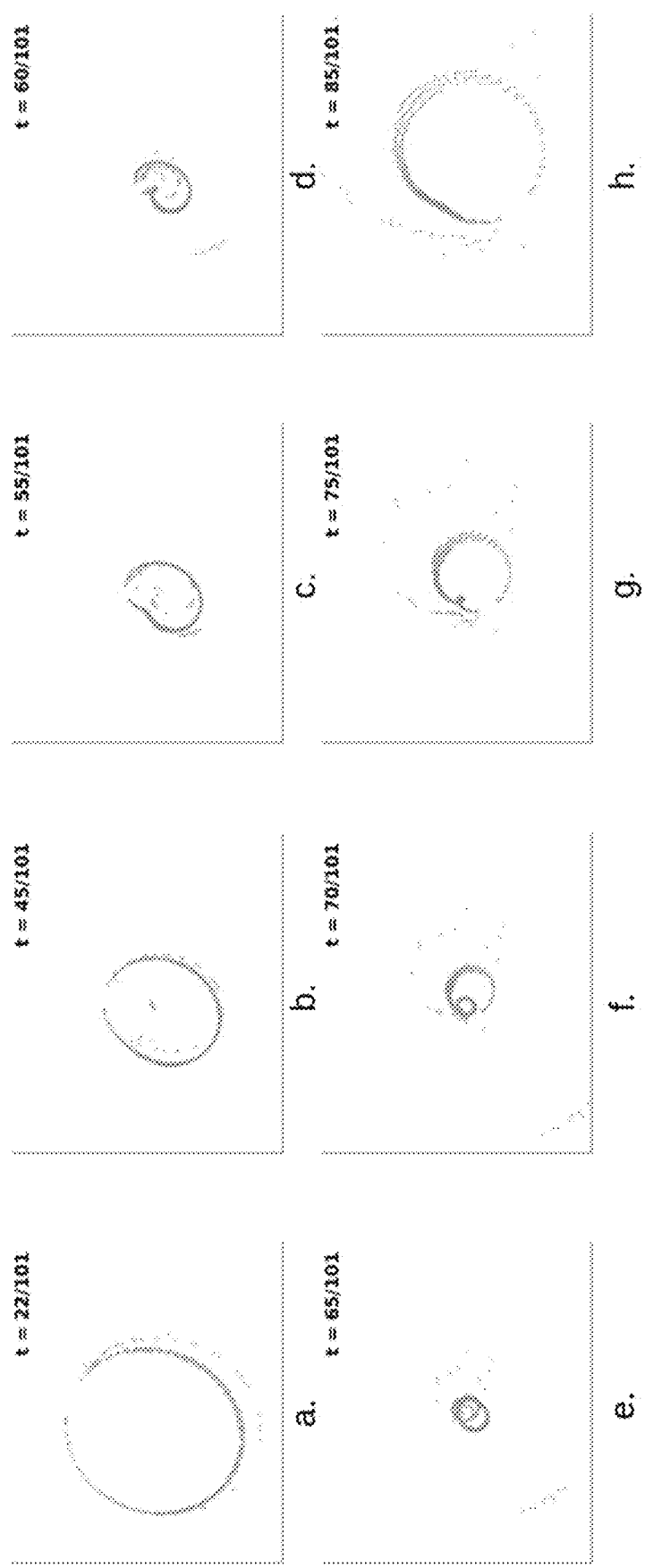
FIG. 23 shows an example of Poincaré sections taken along 9:10 resonant ring trajectories, showing a pinch-point in panel g.

FIG. 23 shows an example of Poincaré sections taken along the 9:10 resonant ring trajectories. The ring can be seen twisting over itself, leaving a pinch point in the top left of panel g.

Figure 24:
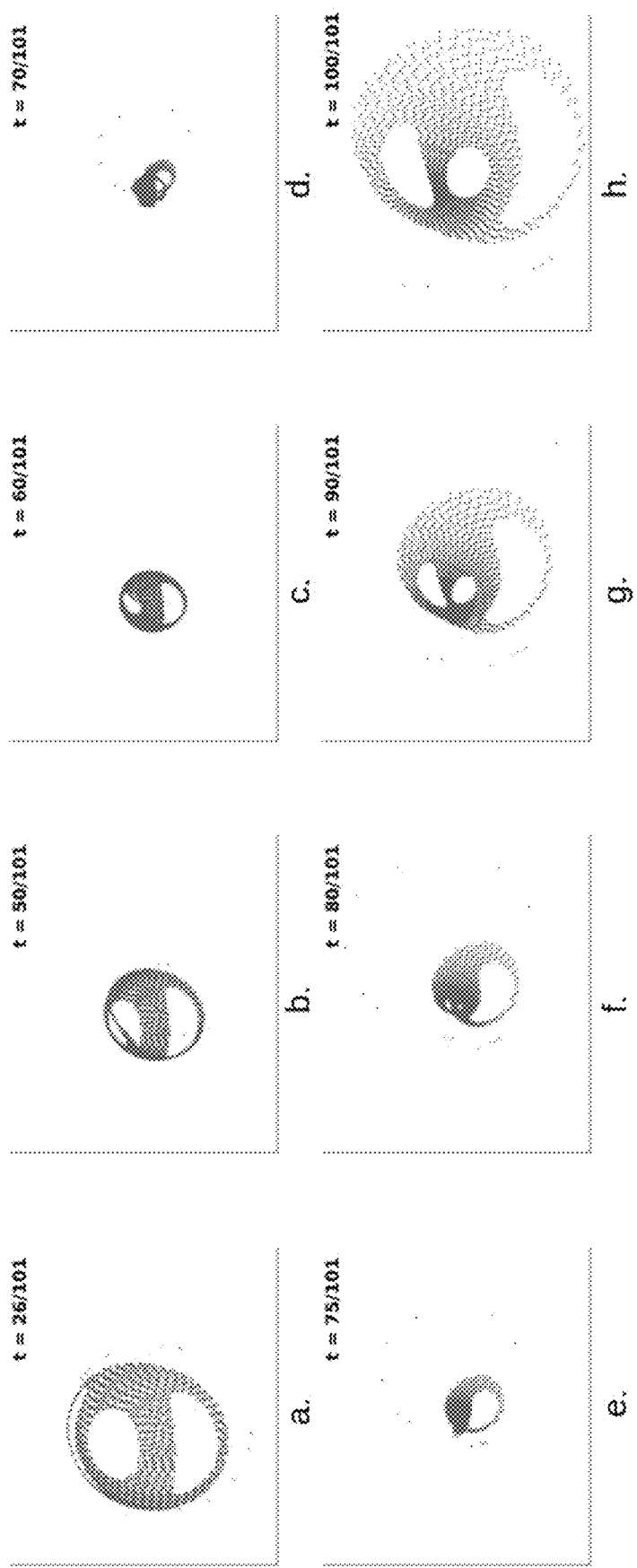
FIG. 24 shows an example of Poincaré sections taken along 11:12 resonant ring trajectories, showing three gaps where the 10:11 and 11:12 rings lie before and after passing through the focus.
Figure 25:
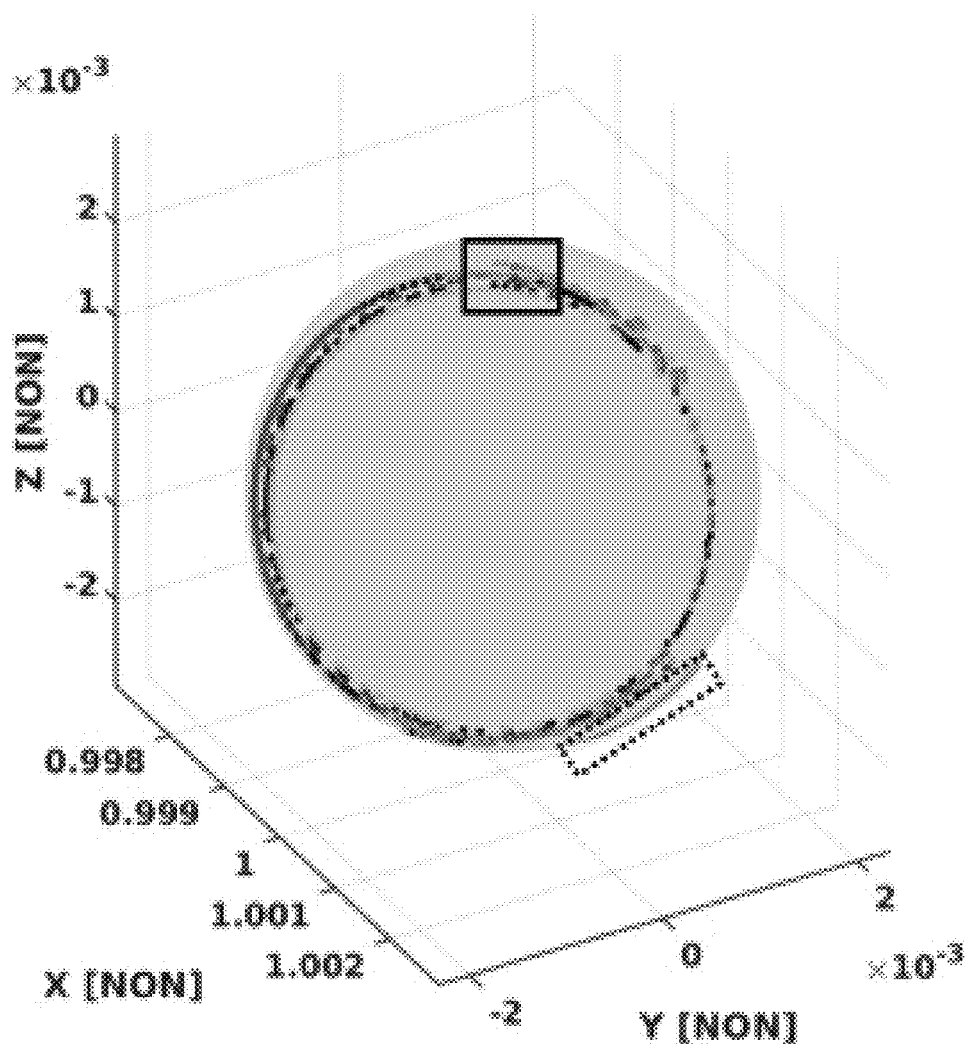
FIG. 25 shows an example resonant encounter map populated with only SOI-resonant orbits.
Figure 26:
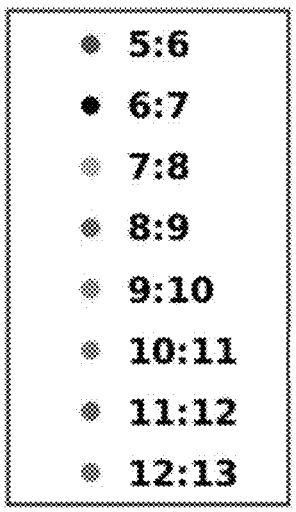
FIG. 26 shows the resonant orbits of FIG. 25.
Figure 27:
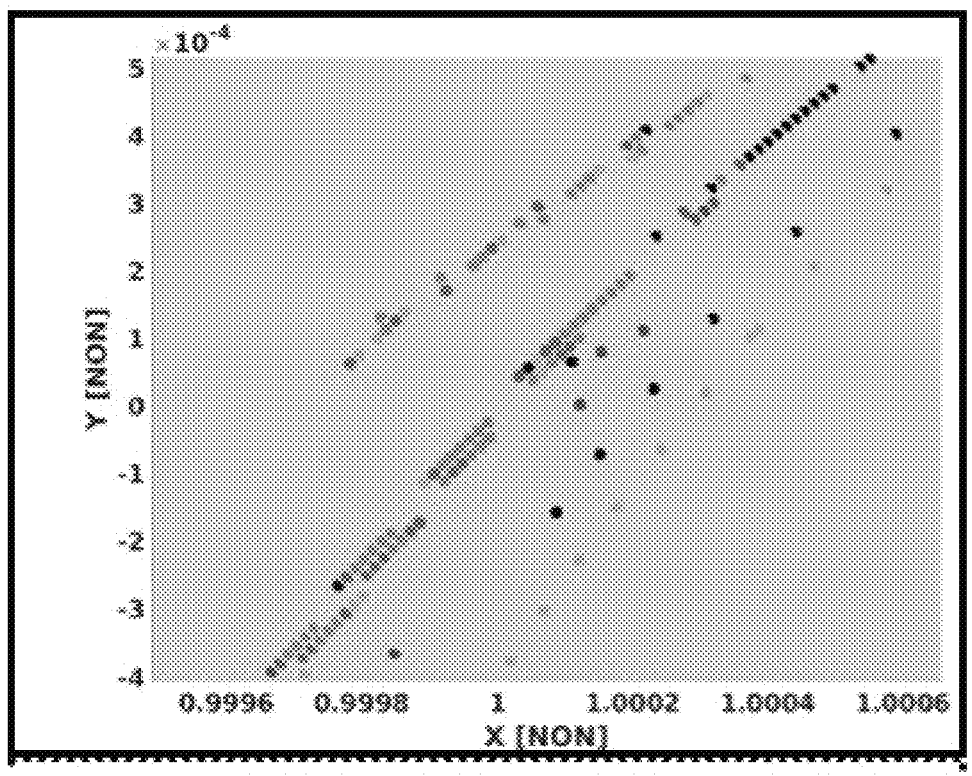
FIG. 27 shows a blow-up of a region (thick rectangle) of FIG. 25.
Figure 28:
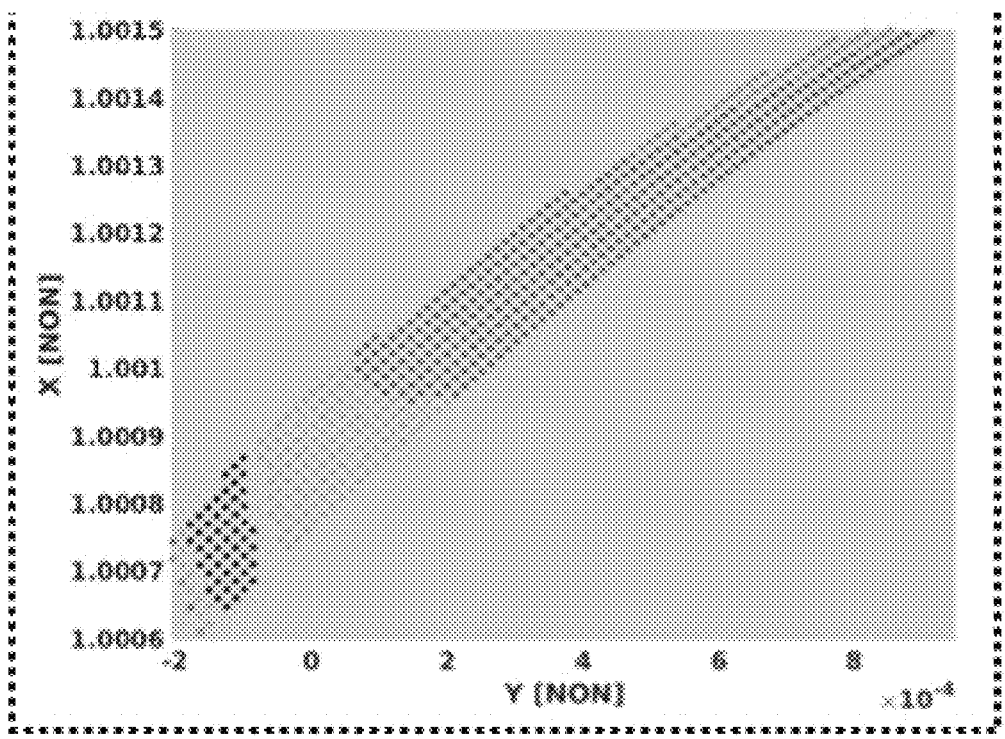
FIG. 28 shows a blow-up of a region (thin rectangle) of FIG. 25.

FIG. 24 shows an example of Poincaré sections taken along the 11:12 resonant ring trajectories. The three gaps where the 10:11 and 11:12 rings lie can be seen clearly before and after passing through the focus.

Figure 4:
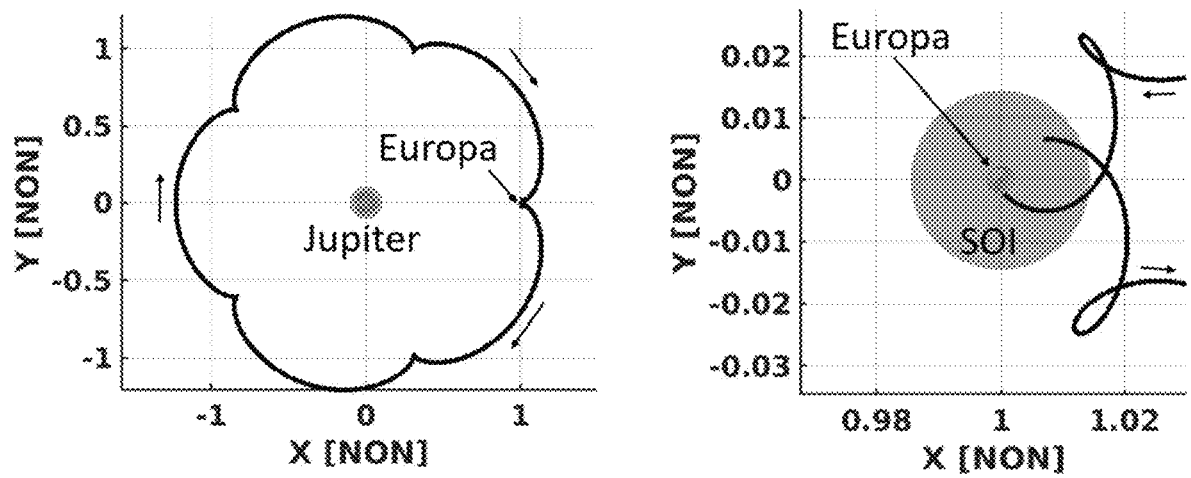
FIG. 4 shows an example SOI-resonant orbit and exit/entry to the SOI.

In some embodiments, SOI-resonant trajectories are used from the map. FIG. 4 shows an example of a SOI-resonant orbit shown in a rotating frame.

SOI-resonant trajectories are useful for missions that incorporate a flyby of the target body to pump down energy before landing. FIGS. 25 to 28 show examples of how the resonant encounter map becomes quite sparse when only accounting for SOI-resonant trajectories. Only the outer ring, where the flight path angle is most shallow, is SOI-resonant. This is convenient, since it is much easier to land with a shallow flight path angle.

Figure 29:
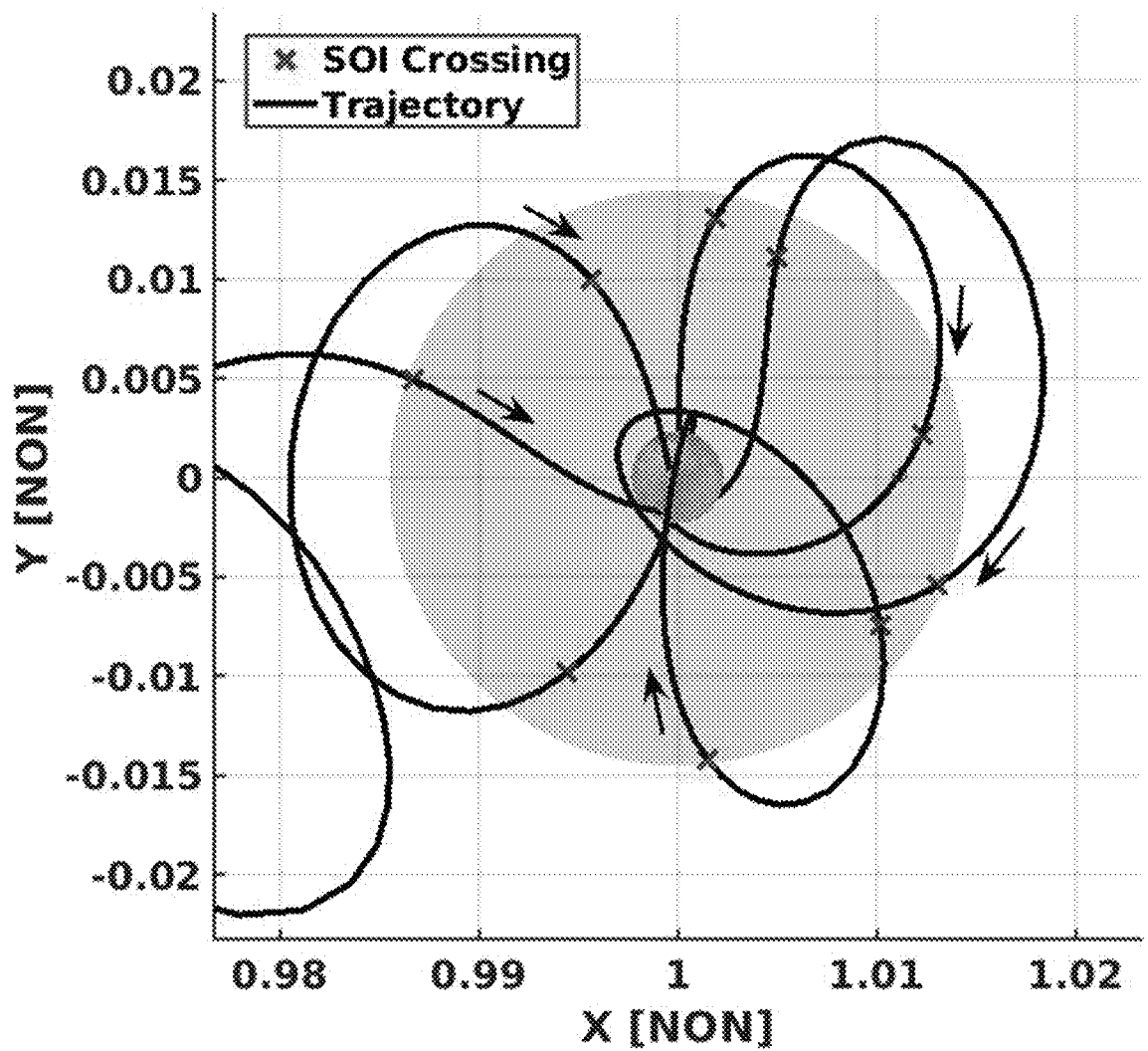
FIG. 29 shows an example of a false SOI-resonant orbit.

When computing SOI-resonant orbits, check for a crossing of $S_1$ between checking for exits and entries of the SOI. Otherwise, it is easy to include false SOI-resonant orbits like the example in FIG. 29, which exits and enters the SOI multiple times before finally leaving through the L1 gateway and never returning.

Figure 30:
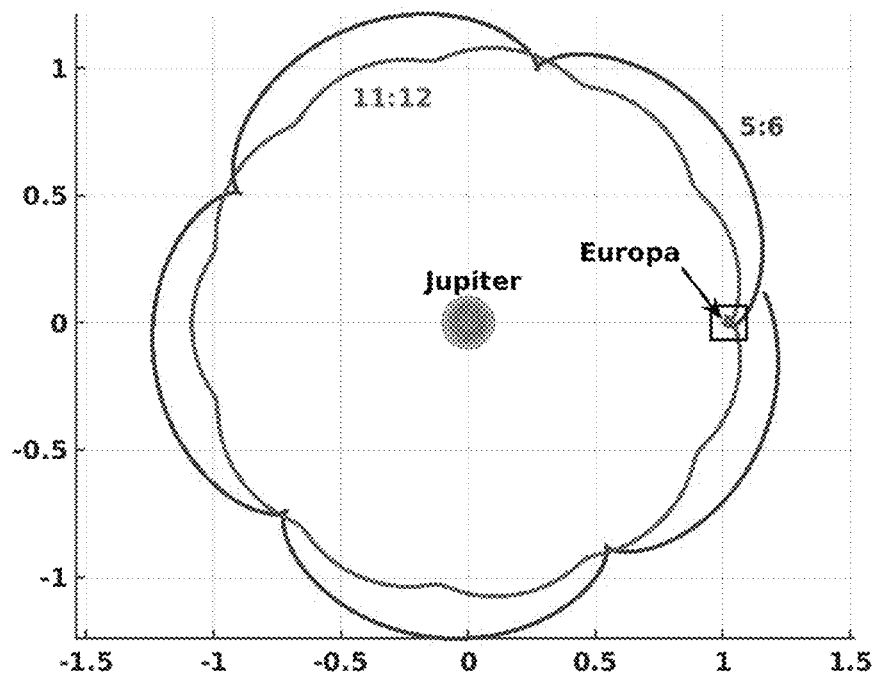
FIG. 30 shows an example of two pseudo-resonant orbits tied with a heteroclinic connection
Figure 31:
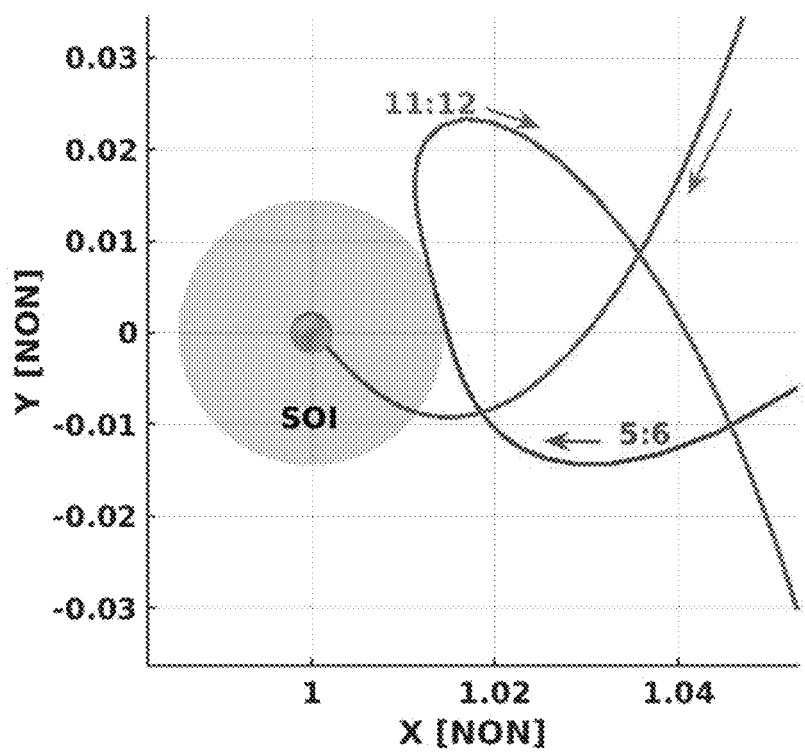
FIG. 31 shows the heteroclinic connection of FIG. 30 close to the secondary body.
Figure 32:
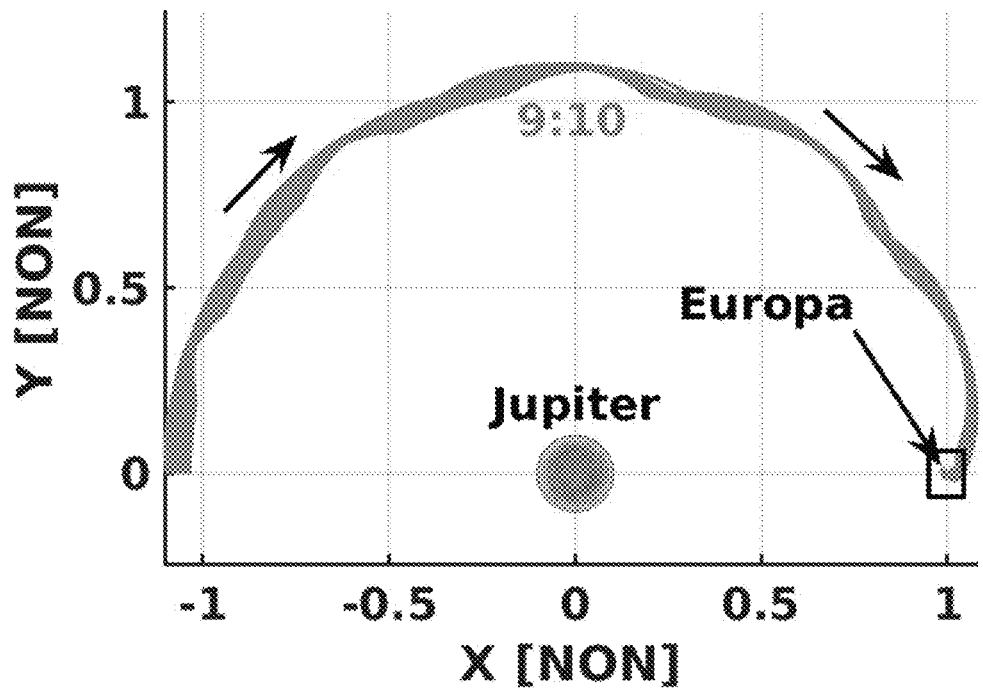
FIG. 32 shows an example 9:10 resonant ring trajectories showing a phase offset.
Figure 33:
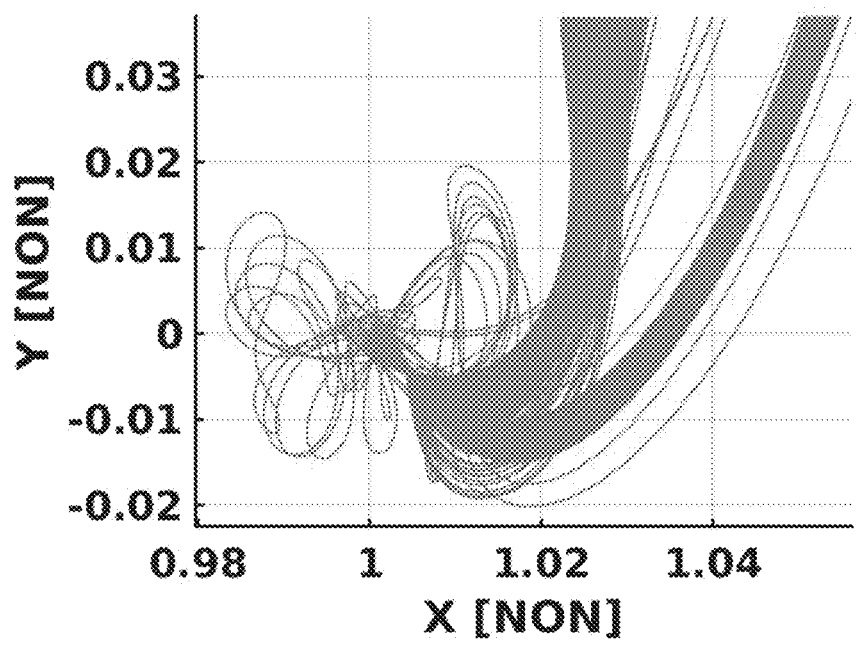
FIG. 33 shows the trajectories of FIG. 32 close to the secondary body.
Figure 34:
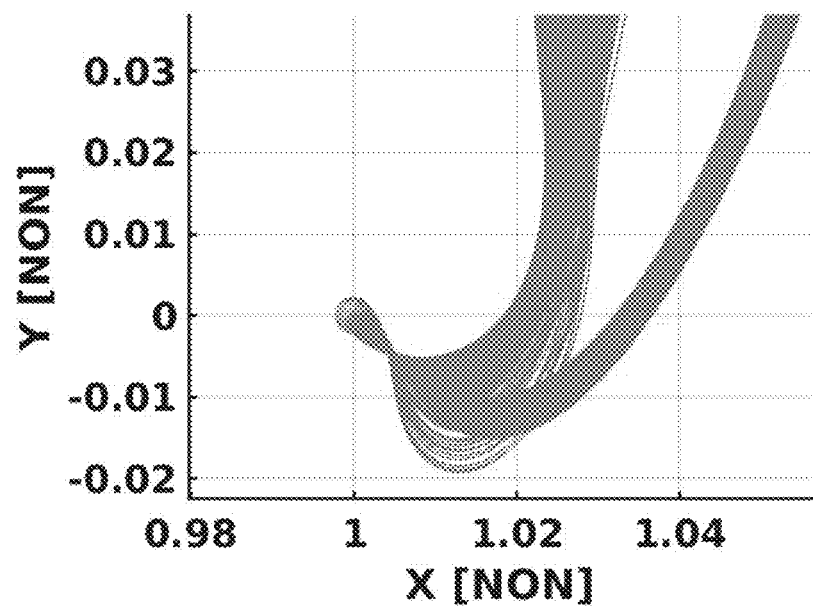
FIG. 34 shows examples of two groups of trajectories taken from FIG. 33.
Figure 35:
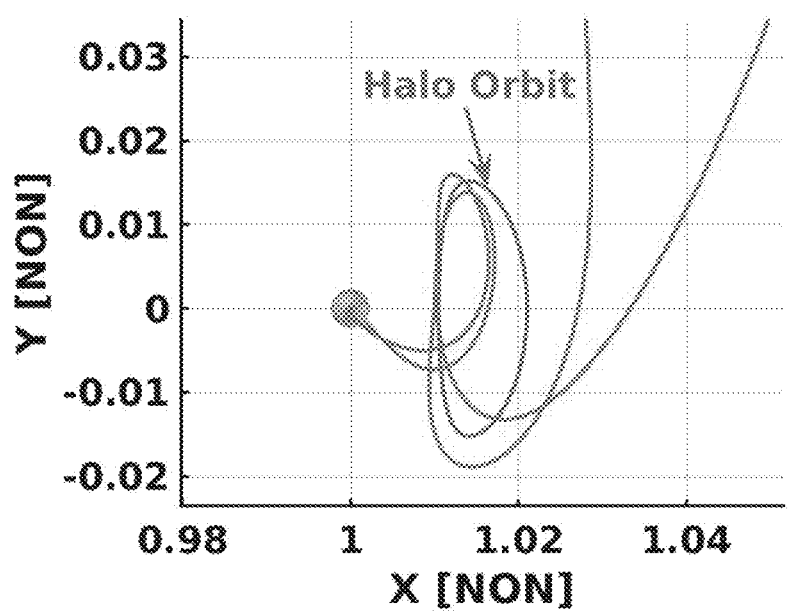
FIG. 35 shows trajectories that seem to follow the stable manifolds of a halo orbit before exiting to join the two main groups of FIG. 34.
Figure 36:
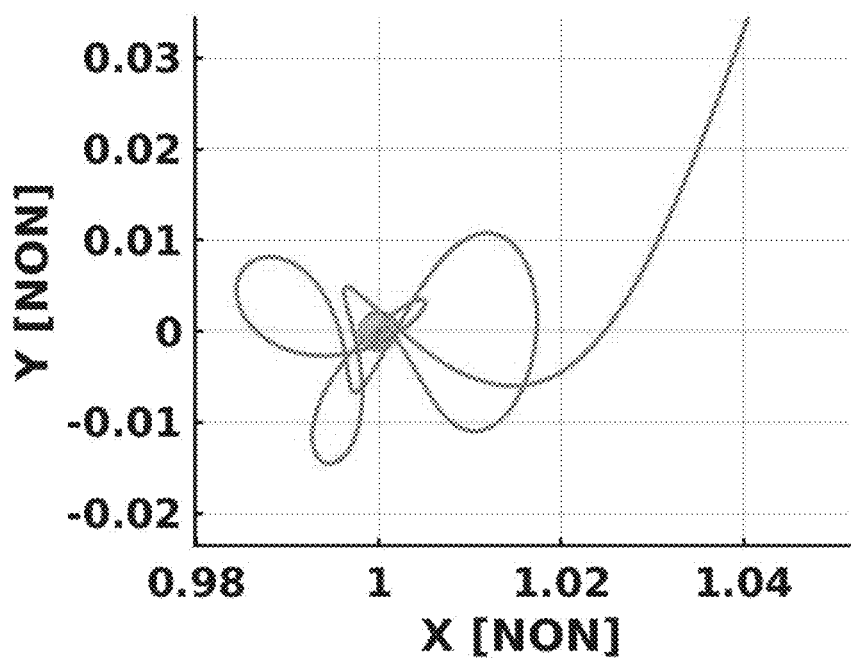
FIG. 36 shows an example trajectory that remains in the SOI for multiple revolutions before finally escaping without joining a group of FIG. 34.

Most SOI-resonant orbits switch from one resonance to another during the flyby. This is illustrated in FIGS. 30 and 31, where there is an example of a 5:6 change into an 11:12 during a close encounter with Europa. This is called a heteroclinic connection.

In some embodiments, groups of trajectories are determined.

When integrating the trajectories of the resonant encounter map, each resonant ring tends to branch off into groups. For example, FIGS. 32 to 36 show how most of the 9:10 resonant ring trajectories can be divided into two mainstream groups. There are some orbits that seem to follow a halo-type trajectory before eventually making their way to one of the mainstream groups. Only a few trajectories don't follow the mainstream groups, and they tend to remain stuck around the secondary body for several orbits before finally escaping.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains. All documents referenced in this specification are incorporated by reference in their entirety.

List of References and Related Matter, all of which are incorporated by reference in their entirety:

[1] J. T. Blanchard, M. W. Lo, D. Landau, and B. D. Anderson, "Invariant Funnels for Resonant Landing Orbits," AAS/AIAA Spaceflight Mechanics Meeting, 2021.

[2] J. T. Blanchard, B. D. Anderson, M. W. Lo, and S. Close, "Low energy capture into high inclination orbits for ocean worlds missions," AAS/AIAA Astrodynamics Specialist Conference, 2020.

[3] V. Szebehely, "Theory of Orbits—The Restricted Three Body Problem," 1967.

[4] H. Pollard, Mathematical Introduction to Celestial Mechanics. Pollard, 1966.

[5] S. Wiggins, Introduction to Applied Nonlinear Dynamical Systems and Chaos. Springer, 2 ed., 2003, 10.1007/b97481.

[6] T. S. Parker and L. O. Chua, "Practical Numerical Algorithms for Chaotic Systems," Mathematics of Computation, Vol. 56, 4 2006, p. 377, 10.2307/2008550.

[7] W. S. Koon, M. W. Lo, J. E. Marsden, and S. D. Ross, Dynamical Systems, the Three-Body Problem and Space Mission Design. Koon, Lo, Marsden, Ross, 2006, 10.1142/9789812792617 0222.

[8] T. M. Vaquero Escribano, Poincaré Sections and Resonant Orbits in the Restricted Three-Body Problem. PhD thesis, Purdue University, 2010.

[9] E. Barrabés and G. Gómez, "A note on second species solutions generated from p-q resonant orbits," Celestial Mechanics and Dynamical Astronomy, Vol. 88, No. 3, 2004, pp. 229-244, 10.1023/B:CELE.0000017163.37356.50.

[10] E. Barrabés and G. Gómez, "Spatial p-q resonant orbits of the RTBP," Celestial Mechanics and Dynamical Astronomy, Vol. 84, No. 4, 2002, pp. 387-407, 10.1023/A:1021137127909.

[11] J. Font, A. Nunes, and C. Sim'o, "Consecutive quasi-collisions in the planar circular RTBP," Nonlinearity, Vol. 15, 1 2002, pp. 115-142, 10.1088/0951-7715/15/1/306.

[12] M.-z. Shao and N. I. Badler, "Spherical Sampling by Archimedes' Theorem," Technical Reports (CIS), Univ. of Pennsylvania, No. January 1996, p. 11.

[13] M. Henon, "On the Numerical Computation of Poincaré Maps," Physica 5D, 1982, pp. 412-414.

[14] M. Deserno, "How to generate equidistributed points on the surface of a sphere," 2004, p. 55128.

[15] R. L. Anderson and M. W. Lo, "Flyby design using heteroclinic and homoclinic connections of unstable resonant orbits," AAS/AIAA Spaceflight Mechanics Meeting, Vol. 140, 2011.

[16] D. L. Richardson, "Analytic construction of periodic orbits about the collinear points," Celestial Mechanics, Vol. 22, No. 3, 1980, pp. 241-253, 10.1007/BF01229511.

The following are claimed:

1. A method to provide a nominal trajectory to land an object on a secondary body orbiting a primary body, the method comprising:
   selecting a Jacobi constant for a nominal trajectory, the nominal trajectory being a landing trajectory for the object to land on the secondary body at a nominal landing site;
   selecting initial conditions comprising a plurality of velocities tangent to the nominal landing site, each of the plurality of velocities having the Jacobi constant;
   selecting a surface of section for the primary body;
   propagating the initial conditions backwards in time for trajectories to intersect the surface of section;
   producing a Poincaré map from the intersections in the surface of section, keeping track of iterations of the trajectories passing through the surface of section;
   producing a Swiss Cheese plot of the k-th iterates by producing a Poincaré map of the k-th iterate in at least 2 steps:
      (i) plot all points using Delaunay variables in 2-dimension;
      (ii) plot points from the k-th iterate such that the points using Delaunay variables can be distinguished from the points from the k-th iterate;
   using the Swiss Cheese plot of the k-th iterate by locating a plurality of resonant trajectories of the k-th iterate by locating those points of the k-th iterate on the Poincaré map that are close to the center points between vertical holes in the Poincaré map which determine a resonance;
   selecting one of the plurality of resonant trajectories as the nominal trajectory.

2. The method of claim 1, wherein the object is a spacecraft.

3. The method of claim 1, wherein the primary body is a planet and the secondary body is a moon of the planet.

4. The method of claim 1, further comprising forming an invariant funnel of trajectories from the initial conditions, the invariant funnel describing a zone of flight for the object surrounding the nominal trajectory.

5. The method of claim 1, further comprising forming a resonant encounter map based on nominal trajectory, the resonant encounter map mapping possible resonances of landing trajectories on a surface of the secondary body.

6. The method of claim 1, wherein the Delaunay variables comprise L and g.

7. The method of claim 1, wherein the primary body, the secondary body, and the object are modeled using Circular Restricted Three-Body Problem.

8. The method of claim 1, wherein the Jacobi constant is determined from a state of a trajectory event at the nominal landing site.

9. A non-transient computer readable medium configured to perform the method of claim 1 when read by a computer.

10. A computer system configured to perform the method of claim 1.

11. A method to provide, for an object, a nominal trajectory to fly-by or orbit near a secondary body orbiting a primary body, the method comprising:
   selecting a Jacobi constant for a nominal trajectory, the nominal trajectory being a trajectory for the object to fly-by or orbit the secondary body at a nominal target site at a distance R from a center of the secondary body;
   selecting initial conditions comprising a plurality of velocities tangent to the nominal target site, each of the plurality of velocities having the Jacobi constant;
   selecting a surface of section for the primary body;
   propagating the initial conditions backwards in time for trajectories to intersect the surface of section;
   producing a Poincaré map from the intersections in the surface of section, keeping track of iterations of the trajectories passing through the surface of section;
   producing a Swiss Cheese plot of the k-th iterates by producing a Poincaré map of the k-th iterate in at least 2 steps:
      (i) plot all points using Delaunay variables in 2-dimension;
      (ii) plot points from the k-th iterate such that the points using Delaunay variables can be distinguished from the points from the k-th iterate;
   using the Swiss Cheese plot of the k-th iterate by locating a plurality of resonant trajectories of the k-th iterate by locating those points of the k-th iterate on the Poincaré map that are close to the center points between vertical holes in the Poincaré map which determine a resonance;

selecting one of the plurality of resonant trajectories as the nominal trajectory.

12. The method of claim 11, wherein the object is a spacecraft.

13. The method of claim 11, wherein the primary body is a planet and the secondary body is a moon of the planet.

14. The method of claim 11, further comprising forming an invariant funnel of trajectories from the initial conditions, the invariant funnel describing a zone of flight for the object surrounding the nominal trajectory.

15. The method of claim 11, further comprising forming a resonant encounter map based on nominal trajectory, the resonant encounter map mapping possible resonances of landing trajectories on a surface of a sphere of radius R around the center of the secondary body.

16. The method of claim 11, wherein the Delaunay variables comprise L and g.

17. The method of claim 11, wherein the primary body, the secondary body, and the object are modeled using Circular Restricted Three-Body Problem.

18. The method of claim 11, wherein the Jacobi constant is determined from a state of a trajectory event at the nominal target site.

19. A non-transient computer readable medium configured to perform the method of claim 11 when read by a computer.

20. A computer system configured to perform the method of claim 11.

* * * * *